United States Patent
Fujimoto et al.

(10) Patent No.: US 7,418,126 B2
(45) Date of Patent: Aug. 26, 2008

(54) IMAGE DISTORTION CORRECTING METHOD AND APPARATUS, AND STORAGE MEDIUM

(75) Inventors: Katsuhito Fujimoto, Kawasaki (JP); Atsuko Ohara, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 10/609,575

(22) Filed: Jul. 1, 2003

(65) Prior Publication Data
US 2004/0022451 A1 Feb. 5, 2004

(30) Foreign Application Priority Data
Jul. 2, 2002 (JP) ................ 2002-193707

(51) Int. Cl.
G06K 9/00 (2006.01)
G06K 9/36 (2006.01)

(52) U.S. Cl. .................. 382/154; 382/289; 382/291

(58) Field of Classification Search ................ 382/154, 382/287, 289, 291, 293–296
See application file for complete search history.

(56) References Cited

U.S. PATENT DOCUMENTS 5,940,544 A * 8/1999 Nako ................ 382/293
5,946,645 A * 8/1999 Rioux et al. ............ 702/155
6,975,352 B2 * 12/2005 Seeger et al. ............ 348/218.1
7,072,527 B1 * 7/2006 Nako ................ 382/290
2002/0044681 A1 4/2002 Fujimoto et al.
2005/0175255 A1 8/2005 Fujimoto et al.

FOREIGN PATENT DOCUMENTS

CN 1342021 3/2002
JP 10-150532 6/1998
JP 2002-150280 5/2002

OTHER PUBLICATIONS

Chinese Office Action dated Aug. 26, 2005 of Application No. 03145746.0.

* cited by examiner

Primary Examiner—Matthew C. Bella
Assistant Examiner—Wesley Tucker
(74) Attorney, Agent, or Firm—Staas & Halsey LLP

(57) ABSTRACT

An image distortion correcting apparatus is provided with an image input section to input an image of a flat rectangular paper surface imaged by an imaging section, as an input image, an imaging position estimating section to estimate a relative imaging position of the imaging section with respect to the paper surface from four vertexes of the rectangular paper surface within the input image, a rectangular paper surface estimating section to estimate four vertexes of the rectangular paper surface within a three-dimensional space based on the imaging position, and an image correcting section to correct a perspective transformation distortion in the paper surface within the input image based on the imaging position and the four vertexes within the three-dimensional space, so as to output an output image.

48 Claims, 14 Drawing Sheets

IMAGE DISTORTION CORRECTING METHOD AND APPARATUS, AND STORAGE MEDIUM

BACKGROUND OF THE INVENTION

This application claims the benefit of a Japanese Patent Application No.2002-193707 filed Jul. 2, 2002, in the Japanese Patent Office, the disclosure of which is hereby incorporated by reference.

1. Field of the Invention

The present invention generally relates to image distortion correcting methods and apparatuses and storage media for correcting distortion within an input image related to a document or book imaged (or picked up) by a digital camera, and more particularly to an image distortion correcting method for correcting the distortion within the input image by estimating an imaging position of the camera, an image distortion correcting apparatus which corrects the distortion within the input image by such an image distortion correcting method, and a computer-readable storage medium which stores a computer program for causing a computer to make such an image distortion correction.

2. Description of the Related Art

Recently, digital cameras have become popular due to improved resolution and reduced cost. Hence, the digital camera is regarded as one suitable tool for inputting paper document information to a computer.

When the digital camera is used to input the paper document information to the computer, the user has more flexibility compared to the case where a conventional contact type image input apparatus such as an image scanner is used, because the user can input the necessary information on the paper to the computer while inspecting the paper or writing on the paper.

On the other hand, unlike a scanned image obtained by the scanner, the image obtained by the digital camera includes a three-dimensional distortion of the image. FIG. 1 is a diagram showing an image 200 which is obtained by imaging a flat paper surface from an oblique angle by the digital camera. In this case, since the paper surface is imaged from the oblique angle from above, a perspective transformation distortion caused by perspective transformation is generated in the image 200.

FIG. 2 is a diagram showing an image 202 which is obtained by imaging a relatively thick book, such as a dictionary, encyclopedia and handbook, which is opened, from an oblique angle by the digital camera. In this case, since the book is imaged from the oblique angle from above, a perspective transformation distortion caused by perspective transformation is generated in the image 202. In addition, a distortion caused by a curved paper surface of the opened book is also generated in the image 202. A composite distortion made of this latter distortion and the perspective transformation distortion will hereinafter be referred to as a "book distortion" in this specification.

In order to input the paper document information to the computer using the digital camera, it is necessary to correct image distortions such as the perspective transformation distortion shown in FIG. 1 and the book distortion shown in FIG. 2, so as to generate a paper surface image 204 shown in FIG. 3 having no distortion. FIG. 3 is a diagram showing the paper surface image 204 which is obtained by imaging a paper document from an oblique angle by the digital camera but including no distortion. Accordingly, there are demands to develop a distortion correcting technique which can generate the paper surface image 204 having no distortion.

For example, a paper document may be bound or stapled at one corner. With respect to such a paper document bound or stapled at one position, an image reading apparatus has been proposed in a Japanese Laid-Open Patent Application No. 10-150532 to correct the image distortion. According to this proposed image reading apparatus, a three-dimensional shape of a contour line is used to measure a three-dimensional distortion of the paper surface. The three-dimensional shape is obtained from an image which is imaged by a scan of a line sensor which uses a CCD array.

In addition, a method of correcting a three-dimensional distortion with respect to a form sheet based on an image which is imaged from above has been proposed in the Japanese Laid-Open Patent Application No. 10-150532.

However, according to the image reading apparatus proposed in the Japanese Laid-Open Patent Application No. 10-150532, there was a problem in that an expensive apparatus is required exclusively for estimating the three-dimensional shape of the contour of the paper surface within the image. In a state where the document or book is placed on a document base, this exclusive apparatus generates a two-dimensional image by imaging line images of the paper surface at a plurality of positions by mechanically moving a line sensor which is arranged above the document base in a sub scan direction while electrically scanning in a main scan direction which is perpendicular to the sub scan direction.

Furthermore, the distortion correcting method proposed in the Japanese Laid-Open Patent Application No. 10-150532 has an advantage in that the distortion can be corrected based on a single image. However, an area CCD imaging element is used as an overhead reader (OHR) and fixed to a stand, so as to image the form sheet positioned below. Hence, it is a precondition that a center of the camera is determined in advance. This is also the case for the image reading apparatus proposed in the Japanese Laid-Open Patent Application No. 10-150532.

Therefore, there was a problem in that the image reading apparatus proposed in the Japanese Laid-Open Patent Application No. 10-150532 and the distortion correcting method proposed in the Japanese Laid-Open Patent Application No. 10-150532 cannot cope with a situation where the imaging position is unknown, such as a case where the user obtains the image of the paper document by the digital camera or the like from an arbitrary position.

SUMMARY OF THE INVENTION

Accordingly, it is a general object of the present invention is to provide a novel and useful image distortion correcting method and apparatus and storage medium, in which the problems described above are eliminated.

Another and more specific object of the present invention is to provide an image distortion correcting method, an image distortion correcting apparatus and a computer-readable storage medium, which can estimate an imaging position from a paper surface within an imaged input image and correct distortion in the imaged input image based on the imaging position, even if the imaging position of the digital camera is unknown.

Still another object of the present invention is to provide an image distortion correcting apparatus comprising an image input section to input an image of a flat rectangular paper surface imaged by an imaging section, as an input image; an imaging position estimating section to estimate a relative imaging position of the imaging section with respect to the paper surface from four vertexes of the rectangular paper surface within the input image; a rectangular paper surface estimating section to estimate four vertexes of the rectangular paper surface within a three-dimensional space based on the imaging position; and an image correcting section to correct a perspective transformation distortion in the paper surface within the input image based on the imaging position and the four vertexes within the three-dimensional space, so as to output an output image. According to the image distortion correcting apparatus of the present invention, it is possible to correct the perspective transformation distortion of the rectangular paper surface within the input image by estimating the imaging position (or camera position) from the input image even when the imaging position is unknown. As a result, the perspective transformation distortion can be corrected regardless of the imaging position, thereby making it possible for the user to image (pick up) documents, form sheets and the like under an extremely flexible environment.

A further object of the present invention is to provide an image distortion correcting apparatus comprising an image input section to input an image of a curved paper surface of an open book imaged by an imaging section, as an input image; an imaging position estimating section to estimate a relative imaging position of the imaging section with respect to the paper surface from four vertexes of the paper surface within the input image; a curved surface estimating section to estimate a three-dimensional curved surface model of the paper surface based on the imaging position and contour information of the paper surface within the input image; and an image correcting section to correct a book distortion in the paper surface within the input image based on the imaging position and the three-dimensional curved surface model of the paper surface, so as to output an output image. According to the image distortion correcting apparatus of the present invention, it is possible to correct the book distortion of the curved paper surface of an open book or the like within the input image by estimating the imaging position (or camera position) from the input image even when the imaging position is unknown. As a result, the book distortion can be corrected regardless of the imaging position, thereby making it possible for the user to image (pick up) the curved paper surface of the open book and the like under an extremely flexible environment.

Another object of the present invention is to provide an image distortion correcting method comprising an image input step to input an image of a flat rectangular paper surface imaged by an imaging step, as an input image; an imaging position estimating step to estimate a relative imaging position of the imaging step with respect to the paper surface from four vertexes of the rectangular paper surface within the input image; a rectangular paper surface estimating step to estimate four vertexes of the rectangular paper surface within a three-dimensional space based on the imaging position; and an image correcting step to correct a perspective transformation distortion in the paper surface within the input image based on the imaging position and the four vertexes within the three-dimensional dimensional space, so as to output an output image. According to the image distortion correcting method of the present invention, it is possible to correct the perspective transformation distortion of the rectangular paper surface within the input image by estimating the imaging position (or camera position) from the input image even when the imaging position is unknown. As a result, the perspective transformation distortion can be corrected regardless of the imaging position, thereby making it possible for the user to image (pick up) documents, form sheets and the like under an extremely flexible environment.

Still another object of the present invention is to provide an image distortion correcting method comprising an image input step to input an image of a curved paper surface of an open book imaged by an imaging step, as an input image; an imaging position estimating step to estimate a relative imaging position of the imaging step with respect to the paper surface from four vertexes of the paper surface within the input image; a curved surface estimating step to estimate a three-dimensional curved surface model of the paper surface based on the imaging position and contour information of the paper surface within the input image; and an image correcting step to correct a book distortion in the paper surface within the input image based on the imaging position and the three-dimensional curved surface model of the paper surface, so as to output an output image. According to the image distortion correcting method of the present invention, it is possible to correct the book distortion of the curved paper surface of an open book or the like within the input image by estimating the imaging position (or camera position) from the input image even when the imaging position is unknown. As a result, the book distortion can be corrected regardless of the imaging position, thereby making it possible for the user to image (pick up) the curved paper surface of the open book and the like under an extremely flexible environment.

A further object of the present invention is to provide a computer-readable storage medium which stores a program for causing a computer to carry out an image distortion correcting process, the program comprising an image input procedure causing the computer to input an image of a flat rectangular paper surface imaged by an imaging procedure, as an input image; an imaging position estimating procedure causing the computer to estimate a relative imaging position of the imaging procedure with respect to the paper surface from four vertexes of the rectangular paper surface within the input image; a rectangular paper surface estimating procedure causing the computer to estimate four vertexes of the rectangular paper surface within a three-dimensional space based on the imaging position; and an image correcting procedure causing the computer to correct a perspective transformation distortion in the paper surface within the input image based on the imaging position and the four vertexes within the three-dimensional space, so as to output an output image. According to the computer-readable storage medium of the present invention, it is possible to correct the perspective transformation distortion of the rectangular paper surface within the input image by estimating the imaging position (or camera position) from the input image even when the imaging position is unknown. As a result, the perspective transformation distortion can be corrected regardless of the imaging position, thereby making it possible for the user to image (pick up) documents, form sheets and the like under an extremely flexible environment.

Another object of the present invention is to provide a computer-readable storage medium which stores a program for causing a computer to carry out an image distortion correcting process, the program comprising an image input procedure causing the computer to input an image of a curved paper surface of an open book imaged by an imaging procedure, as an input image; an imaging position estimating procedure causing the computer to estimate a relative imaging position of the imaging procedure with respect to the paper surface from four vertexes of the paper surface within the input image; a curved surface estimating procedure causing the computer to estimate a three-dimensional curved surface model of the paper surface based on the imaging position and contour information of the paper surface within the input image; and an image correcting procedure causing the computer to correct a book distortion in the paper surface within the input image based on the imaging position and the three-dimensional curved surface model of the paper surface, so as to output an output image. According to the computer-readable storage medium of the present invention, it is possible to correct the book distortion of the curved paper surface of an open book or the like within the input image by estimating the imaging position (or camera position) from the input image even when the imaging position is unknown. As a result, the book distortion can be corrected regardless of the imaging position, thereby making it possible for the user to image (pick up) the curved paper surface of the open book and the like under an extremely flexible environment.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIGS. 4 and 5.

Figure 1:
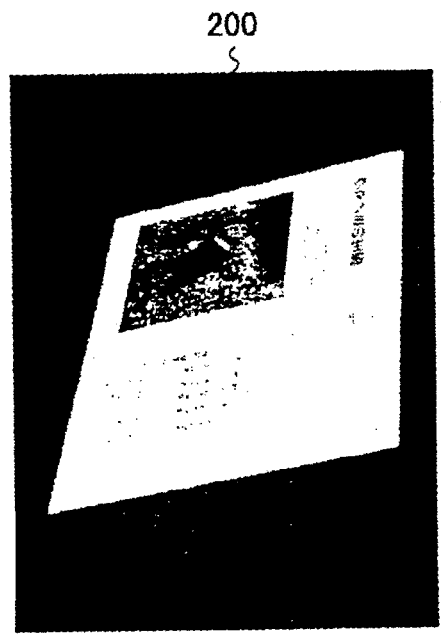
FIG. 1 is a diagram showing an image which is obtained by imaging a flat paper surface from an oblique angle by a digital camera.
Figure 2:
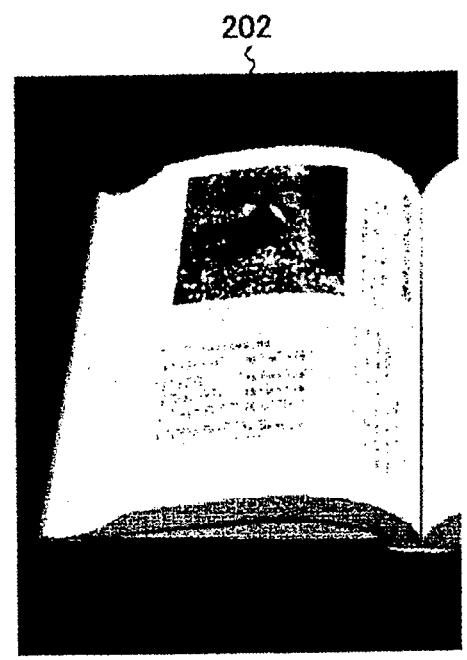
FIG. 2 is a diagram showing an image which is obtained by imaging a thick book, which is opened, from an oblique angle by the digital camera.
Figure 3:
FIG. 3 is a diagram showing a paper surface image which is obtained by imaging a paper document from an oblique angle by the digital camera but including no distortion.
Figure 4:
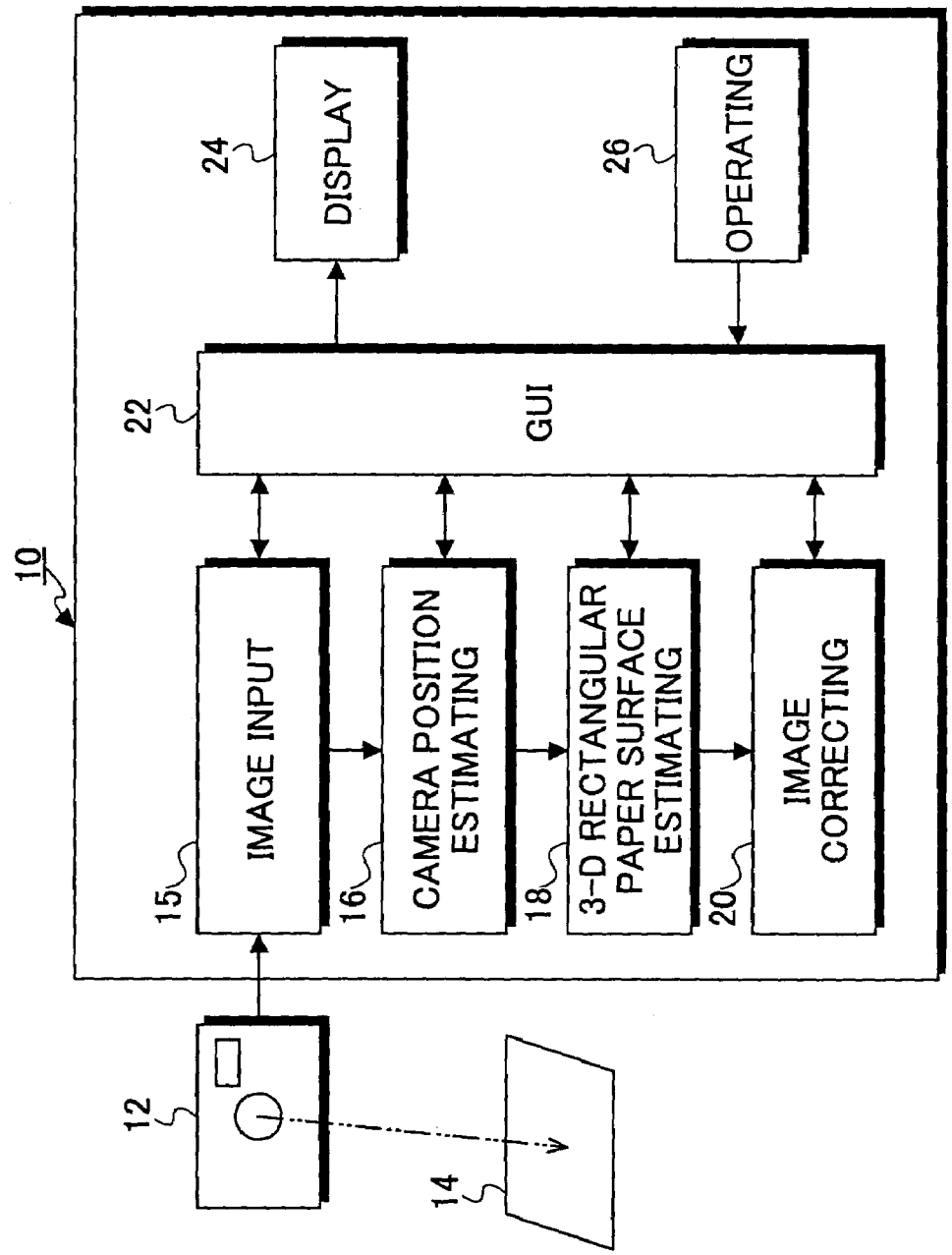
FIG. 4 is a diagram for explaining the operating principle of a first aspect of the present invention when imaging a flat paper surface.

FIG. 4 is a diagram for explaining the operating principle of a first aspect of the present invention when imaging a flat paper surface. An image distortion correcting apparatus 10 shown in FIG. 4 includes an image input section 15, a camera position estimating section 16, a three-dimensional rectangular paper surface estimating section 18, an image correcting section 20, a graphic user interface (GUI) 22, a display section 24 and an operating section 26.

An imaging section such as a digital camera 12 images a flat paper surface 14 to obtain an input image, and this input image is input to the image input section 15. The camera position estimating section 16 functions as an imaging position estimating means for estimating a relative position (or orientation) of the digital camera 12 with respect to the paper surface within the input image, that is, the imaging position, based on four vertexes of the paper surface within the input image. The three-dimensional rectangular paper surface estimating section 18 estimates four vertexes of the rectangular paper surface within a three-dimensional space, based on the imaging position.

The image correcting section 20 corrects a perspective transformation distortion of the paper surface within the input image, based on the imaging position and the positions of the four vertexes of the paper surface within the three-dimensional space, and outputs a corrected image. The image correcting section 20 obtains the position within the input image, corresponding to each pixel of the corrected image, using a plane coordinate system having the contours as the coordinate axes. By setting the value of a corresponding pixel within the input image as a target pixel value of the corrected image, it is possible to generate the corrected image having the length of upper and lower contours as the width, and the length of right and left contours as the height.

The input image and the like are displayed on the display section 24 via the GUI 22. Various information, including the four vertexes of the paper surface within the input image, is input from the operating section 26 via the GUI 22.

Accordingly, it is only necessary to use a single input image which is obtained by imaging the paper surface 14 by the digital camera 12, and the imaging position of the digital camera 12 is estimated from the positions of the four vertexes based on the contour of the paper surface within the input image. In other words, a three-dimensional surface model is estimated by utilizing a restriction that the paper is rectangular (oblong), and the perspective transformation distortion of the paper surface within the input image is corrected based on the estimated imaging position of the digital camera 12 and the estimated three-dimensional surface model.

In other words, the present invention is characterized in that, (a1) the imaging position of the digital camera 12 is estimated from the four vertexes of the paper surface within the input image, and (b1) the four vertexes of the three-dimensional rectangular paper surface are estimated from the four vertexes of the distorted image of the single paper surface. Compared to the conventional method in which the imaging position is fixed, the present invention can cope with a situation where the imaging position of the digital camera 12 is unknown, so as to considerably relax the environment in which the imaging is made.

The input image which is obtained by the digital camera 12 or the like, and the output image which is output from the image correcting section 20, may be a black-and-white bi-level image, a multi-level image or a color image.

The camera position estimating section 15 causes the user to specify the four vertexes of the paper surface within the input image from the operating section 26, using the GUI 22.

Figure 5:
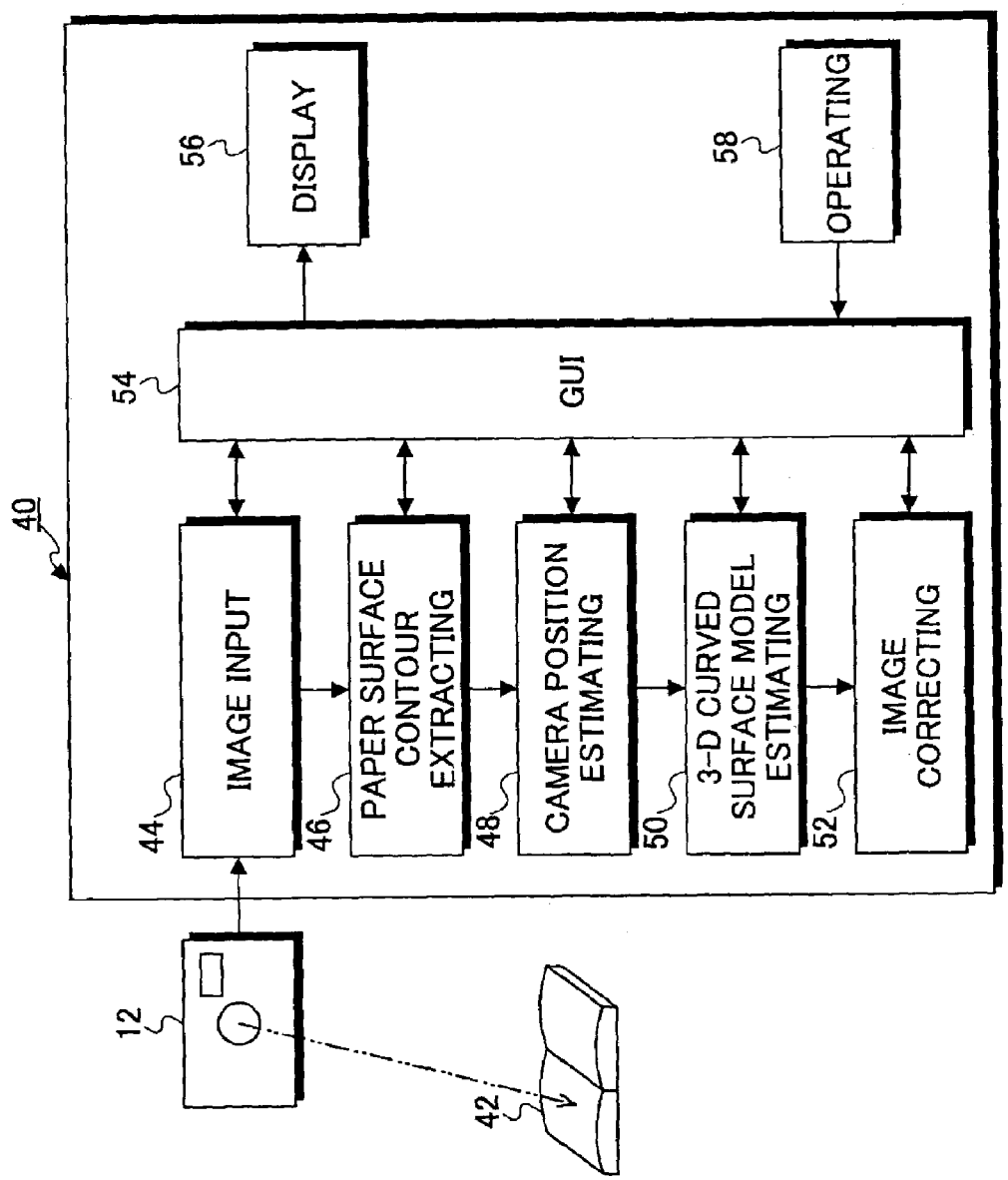
FIG. 5 is a diagram for explaining the operating principle of a second aspect of the present invention when imaging a paper surface of an open book.

FIG. 5 is a diagram for explaining the operating principle of a second aspect of the present invention when imaging a paper surface of an open book. An image distortion correcting apparatus 40 shown in FIG. 5 includes an image input section 44, a camera position estimating section 48, a three-dimensional rectangular curved surface model estimating section 50, an image correcting section 52, a graphic user interface (GUI) 54, a display section 56 and an operating section 58.

An imaging section such as a digital camera 12 images a curved paper surface 42 of an open book to obtain an input image, and this input image is input to the image input section 44. The camera position estimating section 48 functions as an imaging position estimating means for estimating a relative position (or orientation) of the digital camera 12 with respect to the paper surface within the input image, that is, the imaging position, based on four vertexes of the paper surface within the input image. The three-dimensional curved surface model estimating section 50 estimates a three-dimensional curved surface model of the paper surface within the input image, based on the imaging position and contour information of the paper surface within the input image.

The image correcting section 52 corrects a book distortion of the paper surface within the input image, based on the imaging position and the positions of the four vertexes within the three-dimensional curved surface model, and outputs a corrected image. The image correcting section 52 obtains the position within the input image, corresponding to each pixel of the corrected image, using a (curved) surface coordinate system having the contours as the coordinate axes. By setting the value of a corresponding pixel within the input image as a target pixel value of the corrected image, it is possible to generate the corrected image having the length of upper and lower contours as the width, and the length of right and left contours as the height.

The input image and the like are displayed on the display section 56 via the GUI 54. Various information, including the four vertexes of the paper surface within the input image, is input from the operating section 58 via the GUI 54.

Accordingly, it is only necessary to use a single input image which is obtained by imaging the paper surface 42 of the book by the digital camera 12, and the imaging position of the digital camera 12 is estimated from the positions of the four vertexes based on the contour of the paper surface within the input image. In other words, a three-dimensional curved surface model is estimated by utilizing a restriction that (upper) paper surface 42 of the open book is semi-cylindrical, and the book distortion of the paper surface within the input image is corrected based on the estimated imaging position of the digital camera 12 and the estimated three-dimensional curved surface model.

In other words, the present invention is characterized in that, (a2) the imaging position of the digital camera 12 is estimated from the four vertexes of the paper surface within the input image, and (b2) the three-dimensional curved surface model is estimated from the distortion of the paper surface contour of the distorted image of the single paper surface. Compared to the conventional method in which the imaging position is fixed, the present invention can cope with a situation where the imaging position of the digital camera 12 is unknown, so as to considerably relax the environment in which the imaging is made.

The input image which is obtained by the digital camera 12 or the like, and the output image which is output from the image correcting section 52, may be a black-and-white bi-level image, a multi-level image or a color image.

The camera position estimating section 48 causes the user to specify the four vertexes of the paper surface within the input image from the operating section 58, using the GUI 54.

The paper surface contour extracting section 46 causes the user to specify sample points of the paper surface contour, using the GUI 54. The paper surface contour extracting section 46 may cause the user to specify the four vertexes of the paper surface within the input image, using the GUI 54, so as to automatically extract the paper surface contour information by an image processing. Furthermore, the paper surface extracting section 46 may automatically extract all of the paper surface contour information by an image processing.

The paper surface contour extracting section 46 extracts, as the paper surface contour information, a curvilinear model with parameters including spline curve and Bezier curve. In addition, the paper surface contour extracting section 46 may extract, as the paper surface contour information, a polygonal model. In either case, it is possible to easily obtain a three-dimensional curved surface model of the paper surface by approximation, and it is possible to easily correct a 3 HYPERLINK mailto:D@ dimensional curved surface model.

The three-dimensional curved surface model estimating section 50 represents by use of a predetermined energy function a restriction that the lengths of a pair of three-dimensional contours on the top and bottom, and the lengths of a pair of three-dimensional contours on the right and left, of the three-dimensional curved surface model of the paper surface within the input image, are the same, and estimates the three-dimensional curved surface model having parameters which make the energy function a minimum. The four vertexes of the estimated three-dimensional curved surface model makes it possible to automatically adjust the parameters which determine the imaging position for a case which does not fall within the restriction that the lengths of the pair of three-dimensional contours on the top and bottom, and the lengths of the pair of three-dimensional contours on the right and left, of the three-dimensional curved surface model of the paper surface within the input image, are the same. As a result, it is possible to estimate an accurate three-dimensional curved surface model, thereby enabling correction of the book distortion with a high accuracy.

Next, a description will be given of a first embodiment of the image distortion correcting apparatus according to the present invention, by referring to FIG. 4, and FIGS. 6 through 9. This first embodiment of the image distortion correcting apparatus employs a first embodiment of an image distortion correcting method according to the present invention, and a first embodiment of a computer-readable storage medium according to the present invention. In this embodiment, the flat rectangular paper surface 14 is imaged by the digital camera 12 to obtain the input image, and the output image of the paper surface is output by correcting the perspective transformation distortion of the input image.

Figure 6:
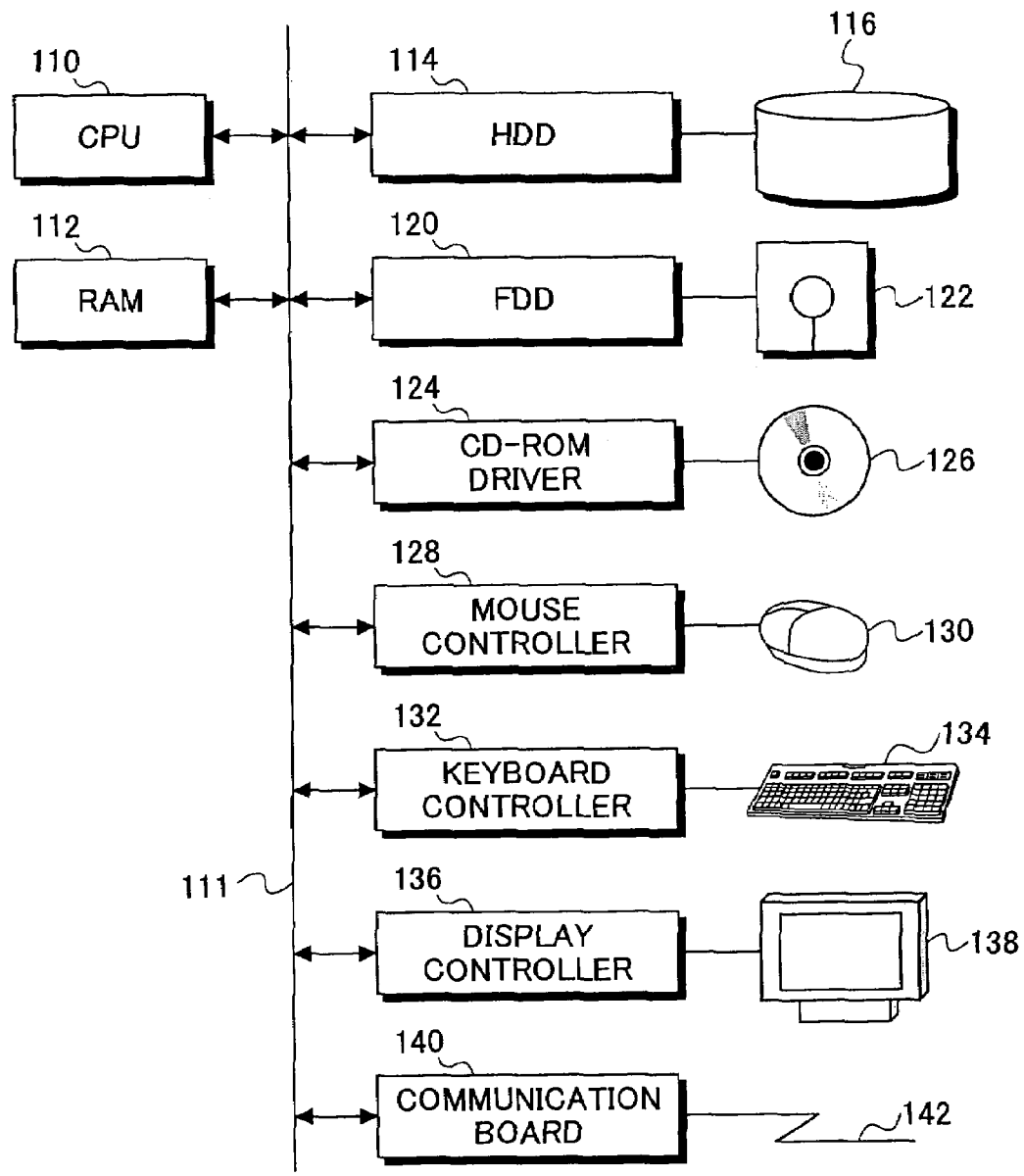
FIG. 6 is a system block diagram showing a computer which forms an image distortion correcting apparatus.

The functions of the image distortion correcting apparatus 10 shown in FIG. 4 may be realized by a hardware resource such as a computer shown in FIG. 6.

The computer shown in FIG. 6 includes a CPU 110, 1 RAM 112, a hard disk controller (software) 114, a floppy disk driver (software) 120, a CD-ROM driver (software) 124, a mouse controller 128, a keyboard controller 132, a display controller 136, and a communication board 140 which are connected via a bus 111.

The hard disk controller 114 is connects to a hard disk drive (HDD, hardware) 116, and loads an application program for carrying out an image distortion correcting process of the present invention into one or more hard disks of the HDD 116. When starting the computer, the necessary program is called from the HDD 116, developed in the RAM 112, and executed by the CPU 110.

The floppy disk driver 120 connects to a floppy disk drive (FDD, hardware) 122, and can read and write with respect to a floppy disk. The CD-ROM driver 124 connects to a CD-ROM drive (hardware) 126, and reads data and programs stored in a CD of the CD-ROM drive 126.

The mouse controller 128 is connected to a mouse 130 and transfers input information which is input by an input operation made by the user on the mouse 130 to the CPU 110. The keyboard controller 32 is connected to a keyboard 134 and transfer input information which is input by an input operation made by the user on the keyboard 134 to the CPU 110. The display controller 136 is connected to a display unit 138 and displays information on the display unit 138. The communication board 140 uses a communication line 142, including a wireless line, to communicate with other computers and servers via one or more networks such as the Internet.

Returning now to the description of FIG. 4, the image input section 15 of the image distortion correcting apparatus 10 inputs the input image of the flat paper surface 14 which is imaged by the digital camera 12. This input image from the digital camera 12 may be a black-and-white bi-level image, a multi-level image or a color image. Similarly, the output image from the image correcting section 20, that is, the corrected image, may be a black-and-white bi-level image, a multi-level image or a color image, in correspondence with the input image from the digital camera 12.

The camera position estimating section 16 estimates the position (or orientation) of the digital camera 12 from the position information of the four vertexes of the paper surface within the input image which is input to the image input section 15. More particularly, the camera position estimating section 16 estimates a relative coordinate position of a camera center position (imaging center position) of the digital camera 12 with respect to the paper surface 14.

For example, the four vertexes of the rectangular paper surface within the input image are specified by the user, by displaying the input image on the display section 24 via the GUI 22 so that the user may specify the four vertexes on the displayed input image from the operating section 26. As will be described later, the four vertexes of the rectangular paper surface within the input image may also be specified using an extracted result of contour information related to the paper surface within the input image.

The three-dimensional rectangular paper surface estimating section 18 estimates the positions of the four vertexes of the rectangular paper surface within the three-dimensional space, based on the four vertexes of the rectangular paper surface within the input image and the estimated camera position.

The image correcting section 20 corrects the perspective transformation distortion, based on the estimated position of the digital camera 12 and the estimated four vertexes of the rectangular paper surface within the three-dimensional space, and outputs the output image in which the perspective transformation distortion is corrected.

Figure 7:
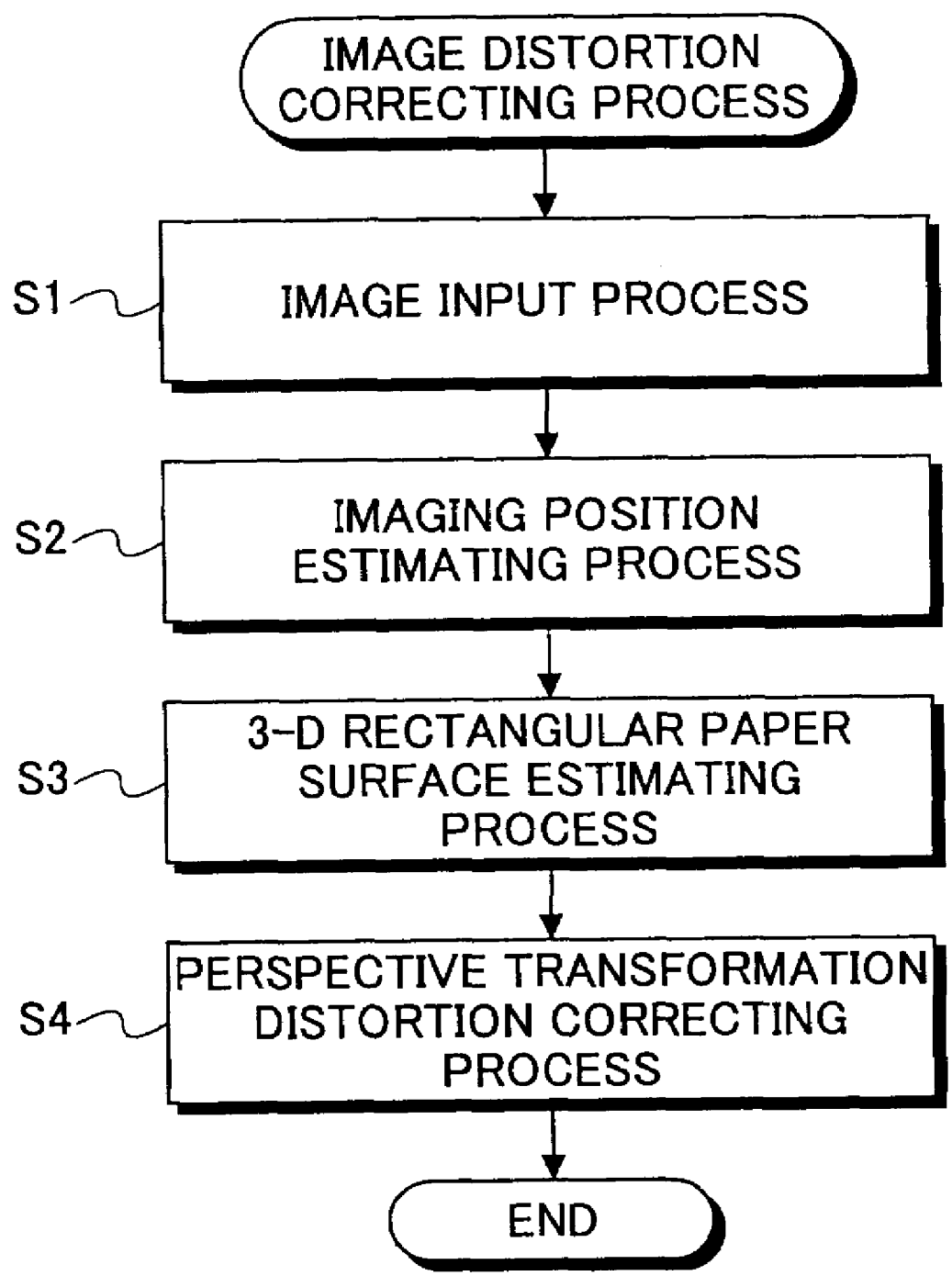
FIG. 7 is a flow chart for explaining a processing procedure of the image distortion correcting apparatus shown in FIG. 4.

FIG. 7 is a flow chart for explaining a processing procedure of the image distortion correcting apparatus 10 shown in FIG. 4. The flow chart of FIG. 7 shows the processing procedure of the program to be executed by the CPU 110 when realizing the functions of the image distortion correcting apparatus 10 shown in FIG. 4 using the hardware resource shown in FIG. 6.

In FIG. 7, a step S1 carries out an input process by the image input section 15, by imaging the paper surface 14 by the digital camera 12 to obtain the input image which is input to the image input section 15. A step S2 estimates the camera (or imaging) position, that is, the relative camera center coordinate, by the camera position estimating section 16 based on the four vertexes of the paper surface within the input image.

Then, a step S3 carries out a three-dimensional rectangular paper surface estimating process by the three-dimensional rectangular paper surface estimating section 18 to estimate the four vertexes of the rectangular paper surface within the three-dimensional space, based on the estimated imaging position and the four vertexes of the paper surface within the input image. Finally, a step S4 carries out a perspective transformation distortion correcting process by the image correcting section 20, based on the estimated imaging position and the estimated four vertexes of the paper surface within the three-dimensional space, to output the output image in which the perspective transformation distortion in the paper surface within the input image generated at the time when the paper surface 14 is imaged by the digital camera 12 is corrected.

Next, a description will be given of the processes carried out by the camera position estimating section 16, the three-dimensional rectangular paper surface estimating section 18 and the image correcting section 20 of the image distortion correcting apparatus 10 shown in FIG. 4 in more detail.

Figure 8:
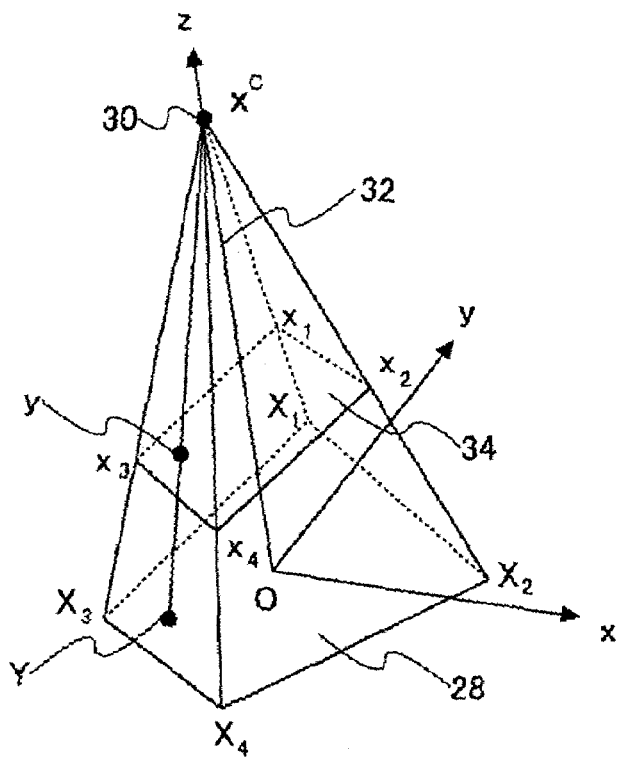
FIG. 8 is a diagram for explaining mechanisms of a perspective transformation distortion used to estimate a camera position in the image distortion correcting apparatus 10 shown in FIG. 4.

FIG. 8 is a diagram for explaining mechanisms of the perspective transformation distortion used to estimate the camera position (imaging position) in the image distortion correcting apparatus 10 shown in FIG. 4.

In FIG. 8, a camera center 30 is positioned above a rectangular paper surface 28 within the input image (hereinafter simply referred to as an image paper surface 28). The camera center 30 has a coordinate $x^c$, and the image paper surface 28 has four vertex coordinates X1, X2, X3 and X4. The camera center 30 and the image paper surface 28 are connected by an optical axis 32. The optical axis 32 is perpendicular to the image paper surface 28, and passes a center O of the image paper surface 28.

A three-dimensional coordinate system is set so that an xy plane overlaps the image paper surface 28 and a z-axis matches the optical axis 32. In such a three-dimensional coordinate system, it is possible to virtually assume that a three-dimensional rectangular paper surface 34 exists at a position shown in FIG. 8, under the restriction that the vertexes x1, x2, x3 and x4 form a rectangle (oblong).

The coordinates of the camera center 30, the four vertexes of the three-dimensional rectangular paper surface 34, and the four vertexes of the image paper surface 28 become as follows.

Camera Center: $x^C = (x^C, y^C, z^C)$

Paper Surface Vertex: $xi = (xi, yi, zi)$

Vertex Within Image: $Xi = (Xi, Yi, 0)$

Division ratios of the heights of the vertexes x1, x2, x3 and x4 of the three-dimensional rectangular paper surface 34 with respect to a height of the camera center 30 are respectively denoted by t1, t2, t3 and t4. Obtaining these division ratios t1, t2, t3 and t4 corresponds to estimating the camera position.

The following formula (1) stands from the relationship of the division.

$$ti = (X^C - xi)/(X^C - Xi) \quad (1)$$

Hence, the following formula (2) stands, where i=1 to 4.

$$xi = (1-ti)x^C + tiXi \quad (2)$$

In addition, the following formula (3) stands because the three-dimensional rectangular paper surface 34 has the rectangular (oblong) shape.

$$x1-x2 = x3-x4, (x1-x2)\cdot(x1-x3) = 0 \quad (3)$$

The following formulas (4) through (6) can be obtained based on the conditions of the above described formulas (2) and (3).

$$k1 = \{(X2-X4)(Y3-Y4)-(Y2-Y4)(X3-X4)\}/\{(X1-X2)(Y3-Y4)-(Y1-Y2)(X3-X4)\}$$

$$k3 = \{(X2-X4)(Y1-Y2)-(Y2-Y4)(X1-X2)\}/\{(X1-X2)(Y3-Y4)-(Y1-Y2)(X3-X4)\} \quad (4)$$

$$H/W = [\{k1X1-k3X3\}^2 + (k1Y1-k3Y3)^2 + (k3-k1)^2(z^C)^2\}/\{(k1X1-(k1+1)X2)^2 + (k1Y1-(k1+1)y2)^2 + (z^C)^2\}]^{1/2} \quad (5)$$

$$(z^C)^2 = \{1/(k1-k3)\}[\{k1X1-(k1+1)X2\}(k1X2-k3X3) + \{k1Y1-(k1+1)Y2\}(k1Y1-k3Y3)] \quad (6)$$

In the formulas (4), k1 and k3 denote constants which are obtained from the vertex coordinates of the image paper surface 28. In the formula (5), H denotes a height of the image paper surface 28 and W denotes a horizontal width of the image paper surface 28. Hence, when the four vertex coordinates X1, X2, X3 and X4 of the image paper surface 28 are given, it is possible to use the constants k1 and k3 calculated by the formulas (4) and obtain an aspect ratio H/W of the three-dimensional rectangular paper surface 34 from the formula (5). Furthermore, a distance $z^C$ between the image paper surface 28 and the camera center 30 can be obtained from the formula (6).

The relationships described by the following formulas (7) stand between the constants k1 and k3 and the internally segmenting ratios t1, t2, t3 and t4.

$$t1 = k1\Delta t$$

$$t2 = (k1+1)\Delta t$$

$$t3 = k3\Delta t$$

$$t4 = (k3+1)\Delta t \quad (7)$$

By setting a largest one of the division ratios t1, t2, t3 and t4 to "1", a unique state is obtained where one of the four vertexes of the three-dimensional rectangular paper surface 34 is set on the image paper surface 28. Thus, it is possible to uniquely determine each of the division ratios t1, t2, t3 and t4 to one value.

For example, if the largest division ratio is t1 in the formula (7), that is, t1=1, $\Delta t = 1/k1$ is obtained from the formula (7), and the values of the remaining division ratios t2, t3 and t4 in the formula (7) are determined. Moreover, the coordinate $x^C = (x^C, y^C, z^C)$ of the camera center 30 is obtained from the distance $z^C$ between the camera center 30 and the image paper surface 28.

The camera position estimating section 16 shown in FIG. 4 obtains the coordinate $x^C = (x^C, y^C, z^C)$ of the camera center 30 from the formulas (4) through (6) using the division ratios t1, t2, t3 and t4, and estimates the position of the digital camera 12.

Next, the three-dimensional rectangular paper surface estimating section 18 shown in FIG. 4 obtains the coordinates of the four vertexes x1, x2, x3 and x4 of the three-dimensional rectangular paper surface 34, based on the following formula (8) which stands because of the relationship of the division shown in FIG. 8, by substituting the values of the division ratios t1, t2, t3 and t4 and the vertex coordinates x1, x2, x3 and x4 of the image paper surface 28 into the formula (8). As a result, the three-dimensional rectangular paper surface estimating section 18 estimates the position of the three-dimensional rectangular paper surface 34 within the three-dimensional space, based on the coordinates x1, x2, x3 and x4 of the four vertexes of the three-dimensional rectangular paper surface 34.

$$xi = (1-ti)x^C + tiXi \quad (8)$$

Figure 9:
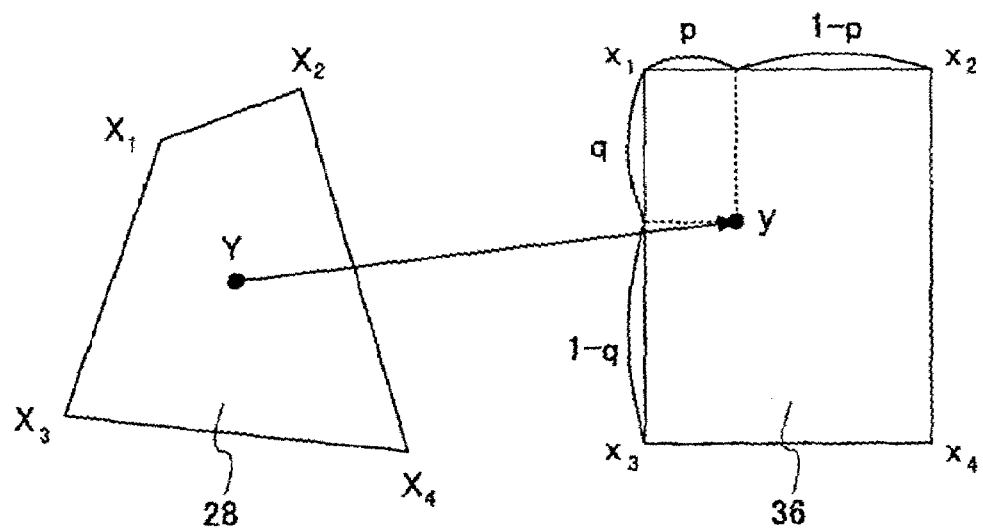
FIG. 9 is a diagram for explaining a corresponding relationship between a pixel on a paper surface within an input image and a pixel on a paper surface within a corrected image.

FIG. 9 is a diagram for explaining a corresponding relationship between a pixel on the paper surface within the input image and a pixel on the paper surface within the corrected image. As shown in FIG. 9, a tone of a pixel at a point y determined by division ratios p and q within an image paper surface 36 after the distortion correction matches a tone of a pixel at a corresponding point Y on the image paper surface 28 before the distortion correction. The relationship of the corresponding pixels on the image paper surfaces 36 and 28 can be described by the following formulas (9) and (10).

$$Y = (1/\hat{s})[(1-p)(1-q)k1X1 + p(1-q)(k1+1)X2 + (1-p)qk3X3 + pq(k3+1)X4] \quad (9)$$

$$\hat{s} = (1-q)k1 + qk3 + p \quad (10)$$

Hence, the image correcting section 20 shown in FIG. 4 can obtain the image paper surface 36 in which the perspective transformation distortion has been corrected, immediately from the image paper surface 28 before the distortion correction, using the formulas (9) and (10).

According to the conventional perspective transformation distortion correction, a tone conversion is made to the two-dimensional image paper surface 36 via a transformation to the three-dimensional rectangular paper surface 34 within the three-dimensional space, since an intersection of a straight line connecting the camera center 30 and the point Y on the image paper surface 28 before the distortion correction in FIG. 5 is the corresponding point y on the image paper surface 36 after the distortion correction.

But in the present invention, the perspective transformation distortion correction is made by making the transformation from the two-dimensional image paper surface 28 before the distortion correction directly to the two-dimensional image paper surface 36 after the distortion correction, since the relationships of the formulas (9) and (10) described above stand.

Next, a description will be given of a second embodiment of the image distortion correcting apparatus according to the present invention, by referring to FIG. 5, and FIGS. 10 through 20. This second embodiment of the image distortion correcting apparatus employs a second embodiment of the image distortion correcting method according to the present invention and a second embodiment of the computer-readable storage medium according to the present invention. In this embodiment, the curved paper surface 42 of the open book is imaged by the digital camera 12 to obtain the input image, and the output image of the paper surface is output by correcting the perspective transformation distortion of the input image. For example, the book is a relatively thick book, such as a dictionary, encyclopedia and handbook.

The functions of the image distortion correcting apparatus 40 shown in FIG. 5 may also be realized by a hardware resource such as the computer shown in FIG. 6.

The image input section 44 of the image distortion correcting apparatus 40 inputs the input image of the curved paper surface 42 of the open book which is imaged by the digital camera 12. This input image from the digital camera 12 may be a black-and-white bi-level image, a multi-level image or a color image. The paper surface contour extracting section 46 extracts the paper surface contour information from the imaged curved paper surface having the semi-cylindrical shape. The extraction of the paper surface contour information may be carried out fully automatically or, by utilizing a portion of the information specified by the user, from the operating section 58, on the image which is displayed on the display section 56 by the GUI 54.

The camera position estimating section 48 estimates the relative camera center coordinate of the digital camera 12, as the camera position (imaging position), based on the four vertexes of the paper surface image obtained from the extracted paper surface contour information. The process carried out by the camera position estimating section 48 is basically the same as that of the camera position estimating section 16 shown in FIG. 4.

The three-dimensional curved surface model estimating section 50 estimates the semi-cylindrical shape within the three-dimensional space, as the three-dimensional curved surface model, under the restriction that the paper surface 42 of the open book which is imaged has the semi-cylindrical shape.

The image correcting section 52 corrects the book distortion, based on the estimated position of the digital camera 12 and the estimated three-dimensional curved surface model having the semi-cylindrical shape, and outputs the output image in which the book distortion is corrected. The output image from the image correcting section 52, that is, the corrected image, may be a black-and-white bi-level image, a multi-level image or a color image, in correspondence with the input image from the digital camera 12.

Figure 10:
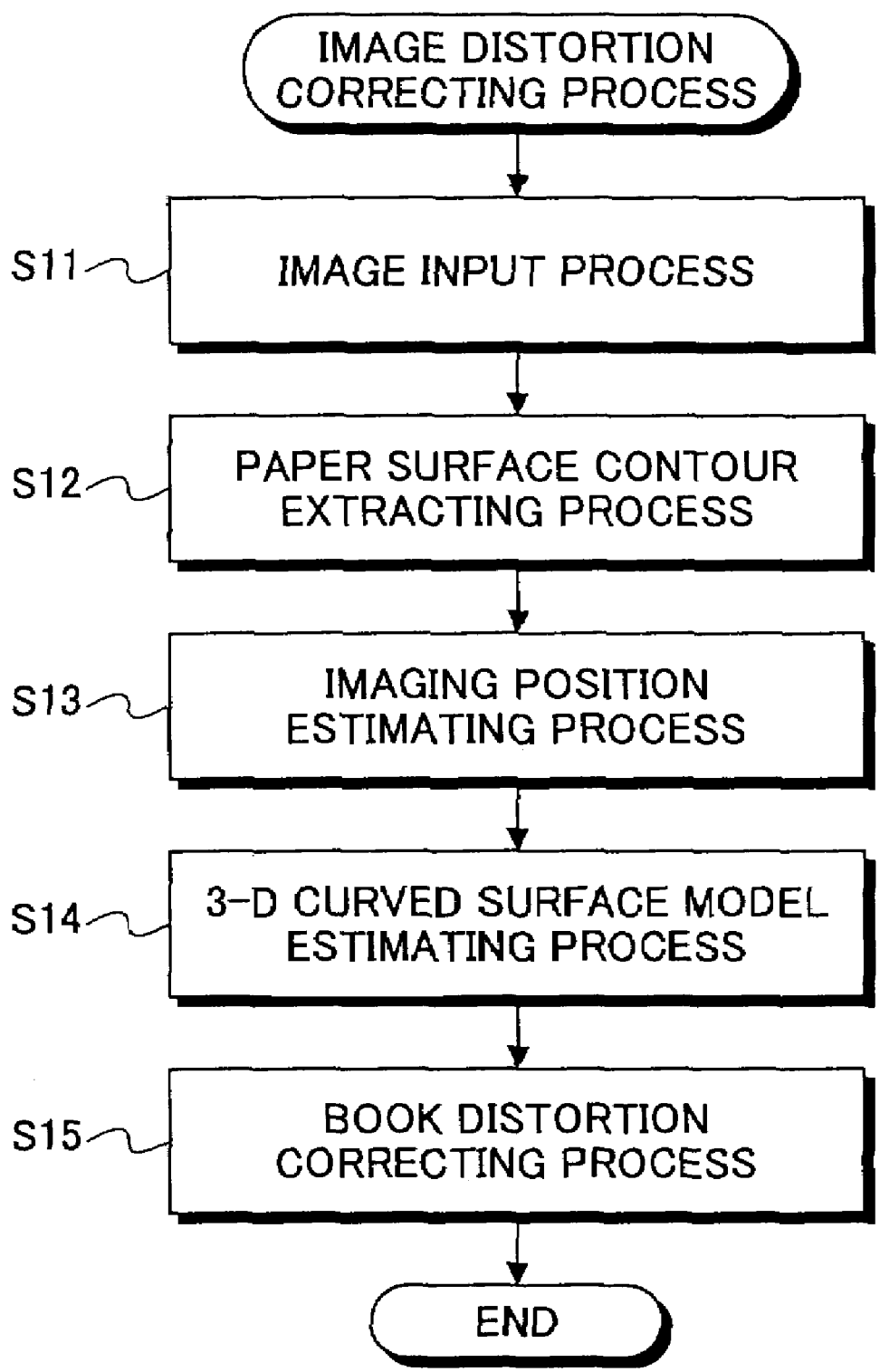
FIG. 10 is a flow chart for explaining a processing procedure of the image distortion correcting apparatus shown in FIG. 5.

FIG. 10 is a flow chart for explaining a processing procedure of the image distortion correcting apparatus 40 shown in FIG. 5. The flow chart of FIG. 10 shows the processing procedure of the program to be executed by the CPU 110 when realizing the functions of the image distortion correcting apparatus 40 shown in FIG. 5 using the hardware resource shown in FIG. 6.

In FIG. 10, a step S11 carries out an input process by the image input section 44, by imaging the paper surface 42 by the digital camera 12 to obtain the input image which is input to the image input section 44. A step S12 carries out a contour extracting process by the paper surface contour extracting section 46, with respect to the curved paper surface having the semi-cylindrical shape within the input image, so as to extract the paper surface contour information. Then, a step S13 estimates the camera (or imaging) position, that is, the relative camera center coordinate, by the camera position estimating section 48 based on the four vertexes obtained from the extracted paper surface contour information.

Next, a step S14 carries out a three-dimensional curved surface model estimating process by the three-dimensional curved surface model estimating section 50 to estimate the curved paper surface of the book having the semi-cylindrical shape within the three-dimensional space, as the three-dimensional curved surface model, based on the estimated imaging position of the digital camera 12 and the extracted contour information of the curved paper surface. Finally, a step S15 carries out a book distortion correcting process by the image correcting section 52, based on the estimated imaging position and the estimated three-dimensional curved surface model, to output the output image in which the book distortion in the paper surface within the input image generated at the time when the paper surface 42 is imaged by the digital camera 12 is corrected.

Next, a description will be given of the processes carried out by the camera position estimating section 48, the three-dimensional curved surface model estimating section 50 and the image correcting section 52 of the image distortion correcting apparatus 40 shown in FIG. 5 in more detail.

Figure 11:
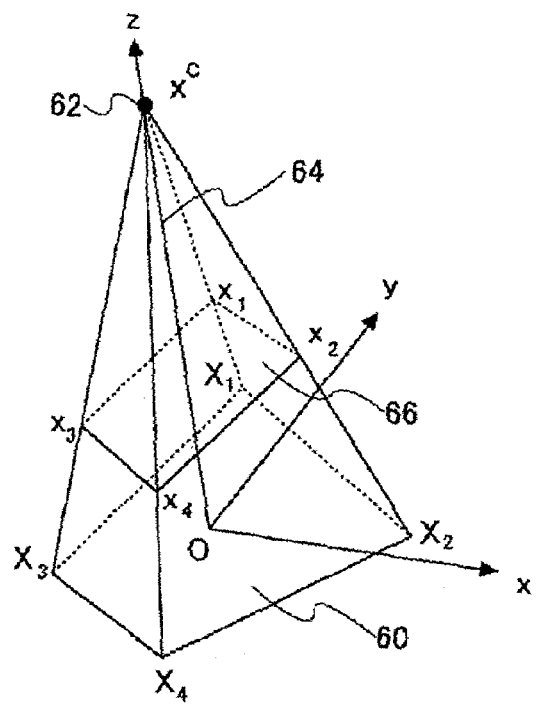
FIG. 11 is a diagram for explaining mechanisms of the perspective transformation distortion used to estimate the camera position (imaging position) in the image distortion correcting apparatus 40 shown in FIG. 5.

FIG. 11 is a diagram for explaining mechanisms of the perspective transformation distortion used to estimate the camera position (imaging position) in the image distortion correcting apparatus 40 shown in FIG. 5. The camera position estimating section 48 shown in FIG. 5 estimates the position of the digital camera 12 using the vertex coordinates of the image paper surface within the contour information obtained by the paper surface contour extracting section 46.

In FIG. 11, a camera center 62 is positioned above a rectangular paper surface 60 within the input image (hereinafter simply referred to as an image paper surface 60). The camera center 62 has a coordinate $x^C$, and the image paper surface 60 has four vertex coordinates X1, X2, X3 and X4 of the paper surface contour. The camera center 62 and the image paper surface 60 are connected by an optical axis 64. The optical axis 64 is perpendicular to the image paper surface 60, and passes a center O of the image paper surface 60.

A three-dimensional coordinate system is set so that an xy plane overlaps the image paper surface 60 and a z-axis matches the optical axis 64. In such a three-dimensional coordinate system, it is possible to virtually assume that a three-dimensional surface model 66 exists at a position shown in FIG. 11, under the restriction that the vertexes x1, x2, x3 and x4 of the semi-cylindrical shaped curved surface exist within the three-dimensional space and form a rectangle (oblong).

In other words, if the resolution and size of the rectangle within the three-dimensional space formed by the four vertexes of the curved paper surface having the semi-cylindrical shape are determined, it is possible to virtually assume that the three-dimensional surface model 66, which is a rectangular flat surface having the vertexes x1, x2, x3 and x4 as shown in FIG. 11, exists at the position shown in FIG. 11.

The coordinates of the camera center 62, the four vertexes of the three-dimensional surface model 66, and the four vertexes of the contour of the image paper surface 60 become as follows.

Camera Center: $x^C = (x^C, y^C, z^C)$

Paper Surface Vertex: $x_i = (x_i, y_i, z_i)$

Contour Vertex Within Image: $X_i = (X_i, Y_i, 0)$

Division ratios of the heights of the vertexes x1, x2, x3 and x4 of the three-dimensional surface model 66 with respect to a height of the camera center 30 are respectively denoted by t1, t2, t3 and t4. Obtaining these division ratios t1, t2, t3 and t4 corresponds to estimating the camera position.

The following formula (11) stands from the relationship of the division.

$$t_i = (X^C - x_i)/(X^C - X_i) \tag{11}$$

Hence, the following formula (12) stands, where i=1 to 4.

$$xi = (1-ti)x^C + tiXi \quad (12)$$

In addition, the following formula (13) stands because the three-dimensional surface model 66 has the rectangular (oblong) shape.

$$x1-x2 = x3-x4, (x1-x2)\cdot(x1-x3) = 0 \quad (13)$$

The following formulas (14) through (16) can be obtained based on the conditions of the above described formulas (12) and (13).

$$k1 = \{X2-X4\}(Y3-Y4)-(Y2-Y4)(X3-X4)\}/\{(X1-X2)(Y3-Y4)-(Y1-Y2)(X3-X4)\}$$

$$k3 = \{X2-X4\}(Y1-Y2)-(Y2-Y4)(X1-X2)\}/\{(X1-X2)(Y3-Y4)-(Y1-Y2)(X3-X4)\} \quad (14)$$

$$H/W = [\{k1X1-k3X3\}^2 + (k1Y1-k3Y3)^2 + (k3-k1)^2(z^C)^2\}/\{(k1X1-(k1+1)X2)^2 + (k1Y1-(k1+1)y2)^2 + (z^C)^2\}]^{1/2} \quad (15)$$

$$(z^C)^2 = \{1/(k1-k3)\}[\{k1X1-(k1+1)X2\}(k1X2-k3X3) + \{k1Y1-(k1+1)Y2\}(k1Y1-k3Y3)] \quad (16)$$

In the formulas (14), k1 and k3 denote constants which are obtained from the vertex coordinates of the image paper surface 60. In the formula (15), H denotes a height of the image paper surface 60 and W denotes a horizontal width of the image paper surface 60. Hence, when the four vertex coordinates X1, X2, X3 and X4 of the image paper surface 60 are given, it is possible to use the constants k1 and k3 calculated by the formulas (14) and obtain an aspect ratio H/W of the three-dimensional surface model 66 from the formula (15). Furthermore, a distance $z^C$ between the image paper surface 60 and the camera center 62 can be obtained from the formula (16).

The relationships described by the following formulas (17) stand between the constants k1 and k3 and the internally segmenting ratios t1, t2, t3 and t4.

$$t1 = k1\Delta t$$

$$t2 = (k1+1)\Delta t$$

$$t3 = k3\Delta t$$

$$t4 = (k3+1)\Delta t \quad (17)$$

By setting a largest one of the division ratios t1, t2, t3 and t4 to "1", a unique state is obtained where one of the four vertexes of the three-dimensional surface model 66 is set on the image paper surface 60. Thus, it is possible to uniquely determine each of the division ratios t1, t2, t3 and t4 to one value. Moreover, the coordinate $x^C = (x^C, y^C, z^C)$ of the camera center 62 is obtained from the distance $z^C$ between the camera center 62 and the image paper surface 60.

The camera position estimating section 48 shown in FIG. 5 obtains the coordinate $x^C = (x^C, y^C, z^C)$ of the camera center 62 from the formulas (14) through (16) using the division ratios t1, t2, t3 and t4, and estimates the position of the digital camera 12.

The three-dimensional surface model estimating section 50 shown in FIG. 5 estimates the distorted paper surface which is distorted in the semi-cylindrical shape, as the three-dimensional curved surface model, based on the estimated camera position and the paper surface contour information within the image paper surface.

Figure 12:
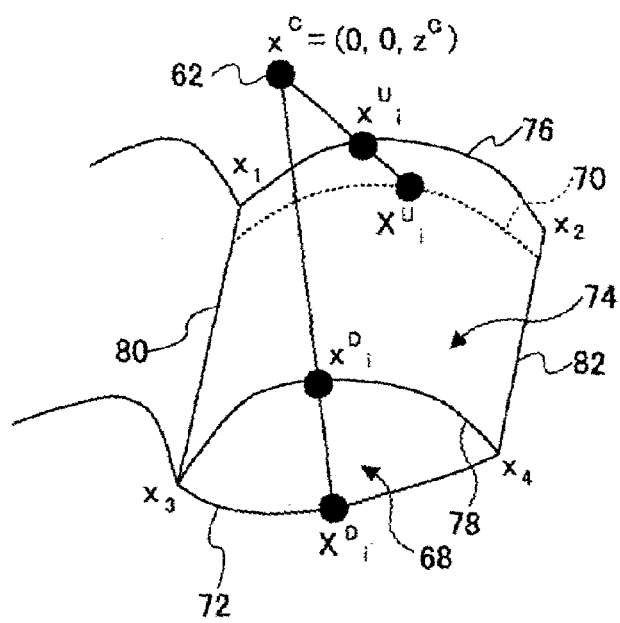
FIG. 12 is a diagram for explaining a three-dimensional curved surface model of the paper surface having the book distortion to be processed by the three-dimensional curved surface model estimating section shown in FIG. 5.

FIG. 12 is a diagram for explaining a three-dimensional curved surface model of the paper surface having the book distortion to be processed by the three-dimensional curved surface model estimating section 50 shown in FIG. 5.

In FIG. 12, contour line information of a two-dimensional image paper surface 68 includes a two-dimensional upper contour line 70, a two-dimensional lower contour line 72, a left contour line 80 and a right contour line 82. The left and right contour lines 80 and 82 on the two-dimensional image paper surface 68 become identical to those of a three-dimensional curved surface model 74.

It is assumed that paper surface contour information including the two-dimensional upper contour line 70 and the two-dimensional lower contour line 72 of the image paper surface 68 is described by a set of two-dimensional sample contour points, as follows.

$$X^U i = (X^U i, Y^U i)(i=1, \ldots, N)$$

$$X^D j = (X^D j, Y^D j)(j=1, \ldots, M)$$

Using the above paper surface contour information of the image paper surface 68, three-dimensional sample contour points in a three-dimensional upper contour line 76 and a three-dimensional lower contour line 78 of the three-dimensional surface model 74 which includes the book distortion and has the semi-cylindrical shape are obtained, so as to estimate the three-dimensional surface model 74 of the curved paper surface of the book having the semi-cylindrical shape. The three-dimensional sample contour points in the three-dimensional upper and lower contour lines 76 and 78 can be described as follows.

$$x^U i = (x^U i, y^U i)(i=1, \ldots, N)$$

$$x^D j = (X^D j, y^D j)(j=1, \ldots, M)$$

FIG. 12 shows a case where the three-dimensional sample upper contour points $x^U i$ and the three-dimensional sample lower contour points $x^D i$ exist on line segments connecting each of the two-dimensional sample upper contour points $X^U i$ and the two-dimensional sample contour points $X^D i$ to the camera center 62.

A division ratio of the height of the three-dimensional upper contour point $x^U i$ with respect to the height of the camera center 62 is denoted by si, and a division ratio of the height of the three-dimensional lower contour point $X^D i$ with respect to the height of the camera center 62 is denoted by ti, where i=1 to N.

The shape of the three-dimensional surface model 74 is estimated by obtaining the 2N parameters, using the conditions which are to be satisfied, namely, that the paper surface is a polygonal surface formed by a set of lines connecting the sample points of the upper and lower contour lines and that the shape obtained by connecting the contour vertexes is rectangular (oblong).

First, the following formulas (18) stand based on the formulas of the division.

$$x^U i = X^U i + (x^C - X^U i)si$$

$$x^D i = X^D i + (x^C - X^D i)ti \quad (18)$$

Because the distorted curved surface of the book has the semi-cylindrical shape, it is a natural precondition that a plane passing the four vertexes x1, x2, x3 and x4 of the paper surface within the three-dimensional space is perpendicular to a plane which includes the three-dimensional sample upper contour point $x^U i$ and the upper contour line vertexes x1 and x2. Hence, the following formula (19) can be obtained using this precondition.

$$(x^U i - x1)\cdot(x1-x3) = 0 \quad (19)$$

The division ratio si can be obtained from the following formula (20) based on the formula (19).

$$si=[x1(x3-x1)+y1(y3-y1)+(z1-z^C)(z3z1)]/[X^U{i}(x3-x1)+Y^U{i}(y3-y1)-z^C(z3-z1)] \quad (20)$$

From the division ratio si which is obtained from the formulas (14), it is a natural condition from the formulas (18) that the plane including the three-dimensional upper contour point $x^U i$ and the plane including the lower contour line vertexes x3 and x4 are perpendicular to each other. Hence, the following formula (21) can be obtained by substituting the precondition described above.

$$(X^D i - x3)\cdot(x1-x3)=0 \quad (21)$$

Based on the formula (21), a division ratio ti can be obtained from the following formula (22).

$$Ti=\{x3(x1-x3)+y3(y1-y3)+(z3-z^C)(z1-z3)\}/\{X^D i(x1-x3)+Y^D i(y1-y3)-z^C(z1-z3)\} \quad (22)$$

The coordinate value of the three-dimensional lower contour point xDi can be determined from the formulas (18) described above, based on the division ratio ti which is obtained from the formula (22).

Accordingly, the three-dimensional curved surface model estimating section 50 regards the polygonal lines obtained by connecting the three-dimensional sample contour points as the three-dimensional upper contour line 76 and the three-dimensional lower contour line 78, as shown in FIG. 12, and further regards a curved surface which is obtained by a linear interpolation approximation with respect to these contour lines as the estimated three-dimensional curved surface model 74 of the paper surface.

Next, a description will be given of the image correcting section 52 shown in FIG. 5. The image correcting section 52 obtains the position within the input image, corresponding to each pixel of the image paper surface after the correction, using the surface coordinate system having the three-dimensional contour lines as the coordinate axes. In addition, the image correcting section 52 sets the value of the corresponding pixel within the input image, that is, the black-and-white binary bi-level value, multi-level value or color value, as the target pixel vale of the paper surface image after the correction, so as to obtain the corrected image having the horizontal width W for the lengths of the upper and lower contour lines and having the height H for the lengths of the right and left contour lines.

In addition, in the case of the paper surface including the book distortion which becomes the semi-cylindrical shape, the left contour line 80 and the right contour line 82 are obtained as the line segments respectively connecting the contour vertexes x1 and x3 and the contour vertexes x2 and x4 of the paper surface, as shown in FIG. 12. Furthermore, the three-dimensional upper contour line 76 and the three-dimensional lower contour line 78 are obtained as polygonal lines connecting the three-dimensional sample contour points which are obtained by the estimation of the three-dimensional curved surface model 74.

An origin of the three-dimensional surface coordinate system is set to the left upper contour vertex x1, the X-axis is set to the three-dimensional upper contour line 76, and the Y-axis is set to the left contour line 80. In addition, an average value of the lengths of the three-dimensional upper contour line 76 and the three-dimensional lower contour line 78 is used as the horizontal width W of the image after the correction (corrected image). Similarly, an average value of the right contour line 82 and the left contour line 80 is used as the height H of the image after the correction (corrected image).

Moreover, in order to put a scale of the X-coordinate on the three-dimensional upper contour line, the three-dimensional coordinate is obtained by making a point U(X) on the three-dimensional upper contour line 76 correspond to the value of the coordinate X taking an integer value greater than or equal to zero and less than or equal to the width W.

In order to obtain the three-dimensional coordinate of the point U(X), a trace is made from the left upper contour vertex x1, that is, the original, on the polygonal line connecting the three-dimensional sample contour points describing the three-dimensional upper contour line 76.

Similarly, the point D(X) on the three-dimensional lower contour line 78 is made to correspond to the coordinate value X taking an integer value greater than or equal to zero and less than or equal to the width W, so as to obtain the three-dimensional coordinate. In order to obtain the three-dimensional coordinate of the point D(X), a trace is made from the left lower contour vertex x3 on the polygonal line connecting the three-dimensional sample contour points describing the three-dimensional lower contour line 78. It may be regarded that the points U(X) and D(X) describe the surface coordinate system.

The following relationships stand if a tone of the pixel corresponding to the two-dimensional coordinate (X, Y) of the image after the book distortion correction is denoted by G(X, Y).

$$0 \leq X \leq W, \ 0 \leq Y \leq H$$

The point corresponding to the two-dimensional coordinate (X, Y) after the correction is a point P having the two-dimensional coordinate (X, Y) of the surface coordinate system on the three-dimensional curved surface model 74. A three-dimensional coordinate $x^P$ of this point P is described by the following formula (23).

$$x^P=(x^P, y^P, z^P) \quad (23)$$

As a point which is obtained by liner interpolation of the point U(X) on the three-dimensional upper contour line 76 and the point D(X) on the three-dimensional lower contour line 78, it is possible to obtain the three-dimensional coordinate of the point P from the following formula (24).

$$x^P=(x^P, y^P, z^P)=(1-Y/H)U(X)+(Y/H)D(X) \quad (24)$$

Next, when a two-dimensional coordinate (X, Y) of an intersection P between the xy reference plane and a straight line from the camera center 62 and passing through the point P on the three-dimensional curved surface model 74 is obtained from the condition of the perspective transformation, the following formula (25) stands.

$$(X, Y)=((x^P z^K - x^K z^P)/(z^K - z^P), (y^P z^K - y^K z^P)/(z^K - z^P)) \quad (25)$$

Accordingly, the tone G(X, Y) within the image after the correction can be obtained from the following formula (26), where G(X, Y) denotes a tone value of a pixel having the two-dimensional coordinate (X, Y) of the image before the correction, and [x] denotes a Gaussian symbol of a largest integer not exceeding x.

$$G(X, Y) = \tilde{G}([\tilde{X}+1/2], [\tilde{Y}+1/2]) \quad (26)$$
$$= \tilde{G}([(x^P z^K - x^K z^P)/(z^K - z^P)+1/2],$$
$$[(y^P z^K - y^K z^P)/(z^K - z^P)+1/2])$$

Next, a more detailed description will be given of the paper surface contour extracting section 46 shown in FIG. 5. The paper surface contour extracting section 46 extracts the contour line information of the semi-cylindrical paper surface of the book within the input image, which is necessary for the processes carried out in the camera position estimating section 48 and the three-dimensional curved surface model estimating section 50.

Figure 13:
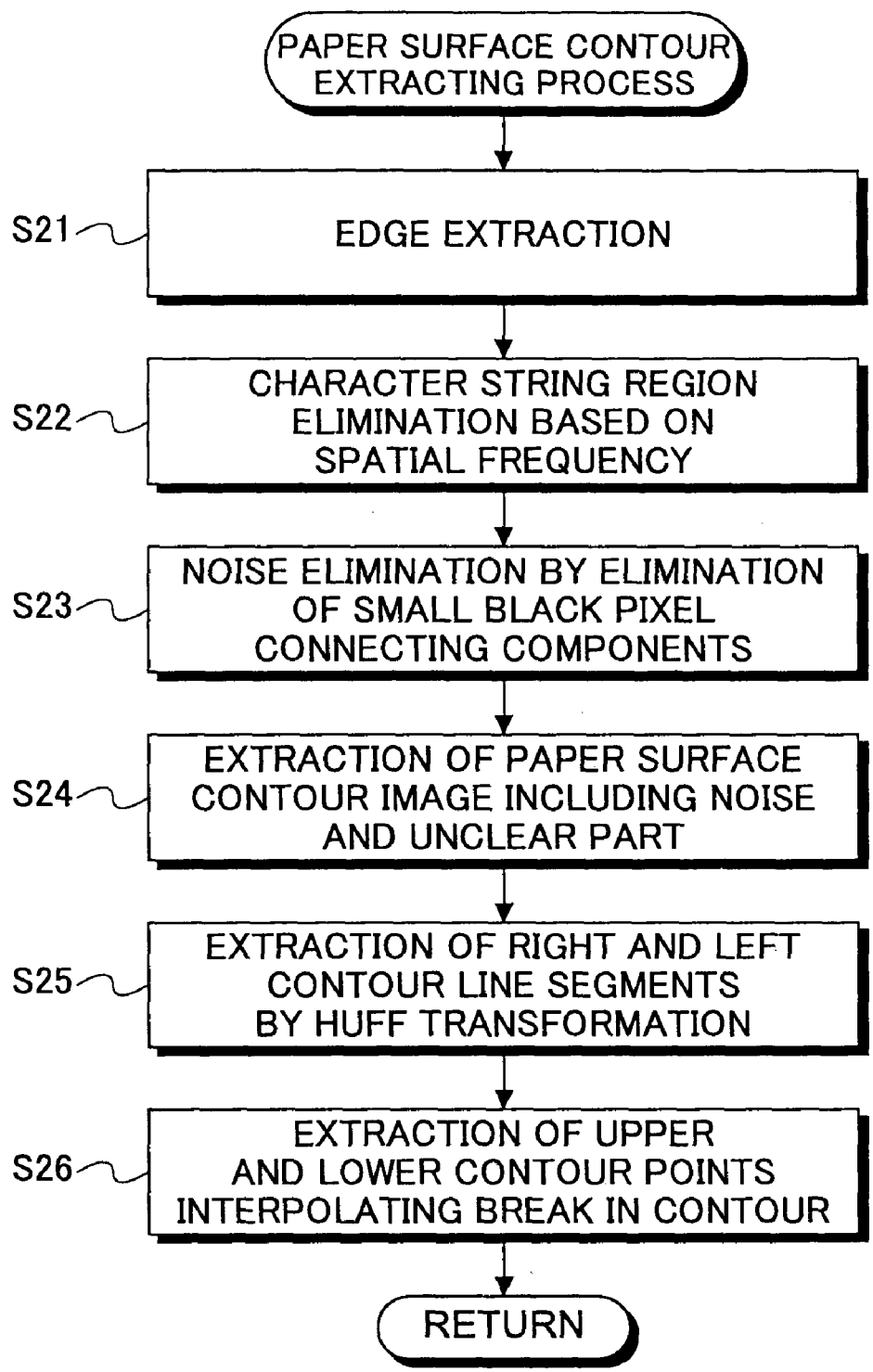
FIG. 13 is a flow chart for explaining a processing procedure of a paper surface contour extracting section shown in FIG. 5.

FIG. 13 is a flow chart for explaining a processing procedure of the paper surface contour extracting section 46 shown in FIG. 5. FIG. 13 shoes a detailed processing procedure of the paper surface contour extracting process of the step S12 shown in FIG. 10.

In the paper surface contour extracting process shown in FIG. 13, a step S21 carries out an edge extraction process with respect to the image of the book, and a step S22 eliminates a character string region from the edge image based on the spatial frequency. Then, a step S23 carries out a noise elimination process with respect to the edge image which is eliminated of the character string region, so as to eliminate small black pixel connecting components.

A step S24 extracts from the edge image which is eliminated of the noise a paper surface contour image which includes noise and unclear part (thin part) at the contour portion. Further, a step S25 carries out a right and left contour line segment extracting process to extract the right and left contour lines and form the extracted contour lines into a straight line. Finally, a step S26 carries out an upper and lower contour line extracting process to interpolate the break in the contour lines, based on a polygonal line, a spline curve, a Bezier curve or the like, for example.

Figure 14:
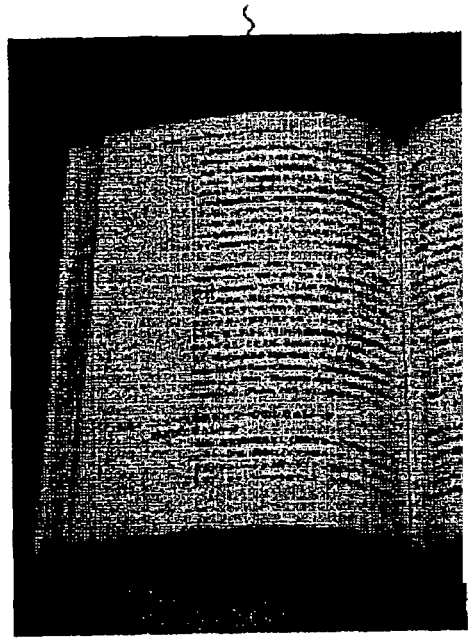
FIG. 14 is a diagram for explaining an input image of a book which is the target of a paper surface contour extracting process.

The details of the paper surface contour extracting process shown in FIG. 13 become as follows. For example, assume that an image 84 shown in FIG. 14 which includes the book distortion and is imaged by the digital camera 12 is input to the image input section 44. FIG. 14 is a diagram for explaining an input image of a book which is the target of the paper surface contour extracting process.

Figure 15:
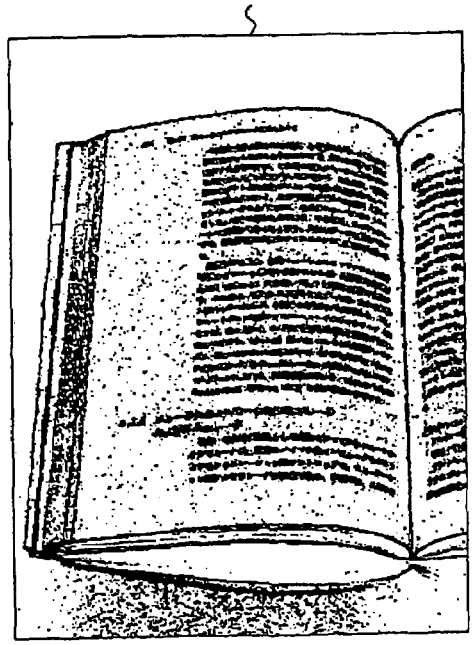
FIG. 15 is a diagram for explaining an edge image which is obtained from the input image shown in FIG. 14.

When the step S21 shown in FIG. 13 obtains the edge image including the contour of the paper surface of the book with respect to the image 84 using an edge extraction filter such as a Zobel edge filter, an edge image 85 shown in FIG. 15 is obtained. FIG. 15 is a diagram for explaining the edge image which is obtained from the input image shown in FIG. 14.

The step S23 shown in FIG. 13 eliminates the character string region with respect to the edge image 85 based on the spatial frequency. The character string region within the edge image 85 is eliminated by detecting a region with a high spatial frequency as the character string region.

For example, in a linear region having a predetermined width (a predetermined number of dots) about a target pixel at the center, averages of absolute values of tone differences among the pixels having pixel pitches of 1 to S dots are obtained, and further, an average of the average values is obtained for each of the pixel pitches of 1 to S dots. This average of the average values obtained for each of the pixel pitches of 1 to S dots is used as a quantity reflecting the spatial frequency.

Figure 16:
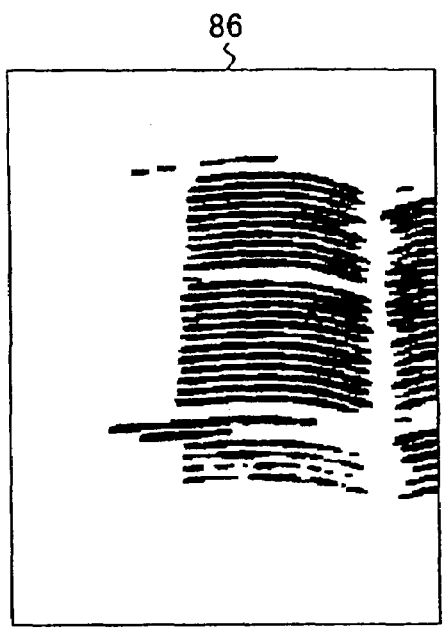
FIG. 16 is a diagram for explaining a bi-level image of a region having a high spatial frequency.
Figure 17:
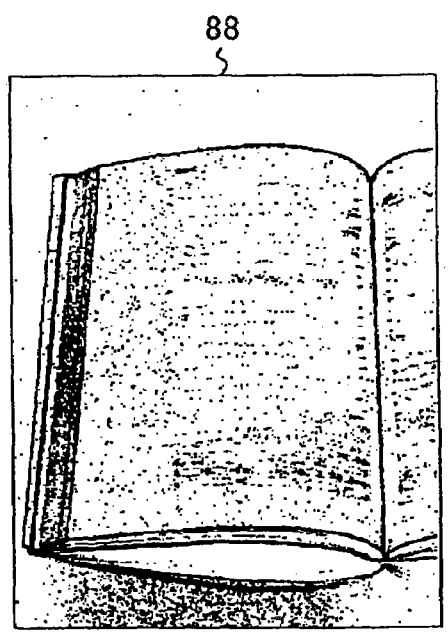
FIG. 17 is a diagram for explaining an edge image eliminated of the character string region.

FIGS. 16 and 17 respectively are diagrams for explaining a bi-level image 86 of a region having a high spatial frequency and an edge image 88 eliminated of the character string region.

The bi-level image 86 shown in FIG. 16 is obtained as follows. First, the tone difference image reflecting the spatial frequency which is obtained for a case where the predetermined width is 65 dots and the pixel pitch is 8 dots, is binarized with respect to the edge image 85 shown in FIG. 15. The black pixel after the binarization is thickened by 10 dots, and the edge image is changed to white pixels, so as to obtain the region with the high spatial frequency, that is, the bi-level image 86.

The edge image 88 shown in FIG. 17, which is eliminated of the character string region, is obtained by eliminating the bi-level image 86 shown in FIG. 16 having the high spatial frequency from the edge image 85 shown in FIG. 15.

Figure 18:
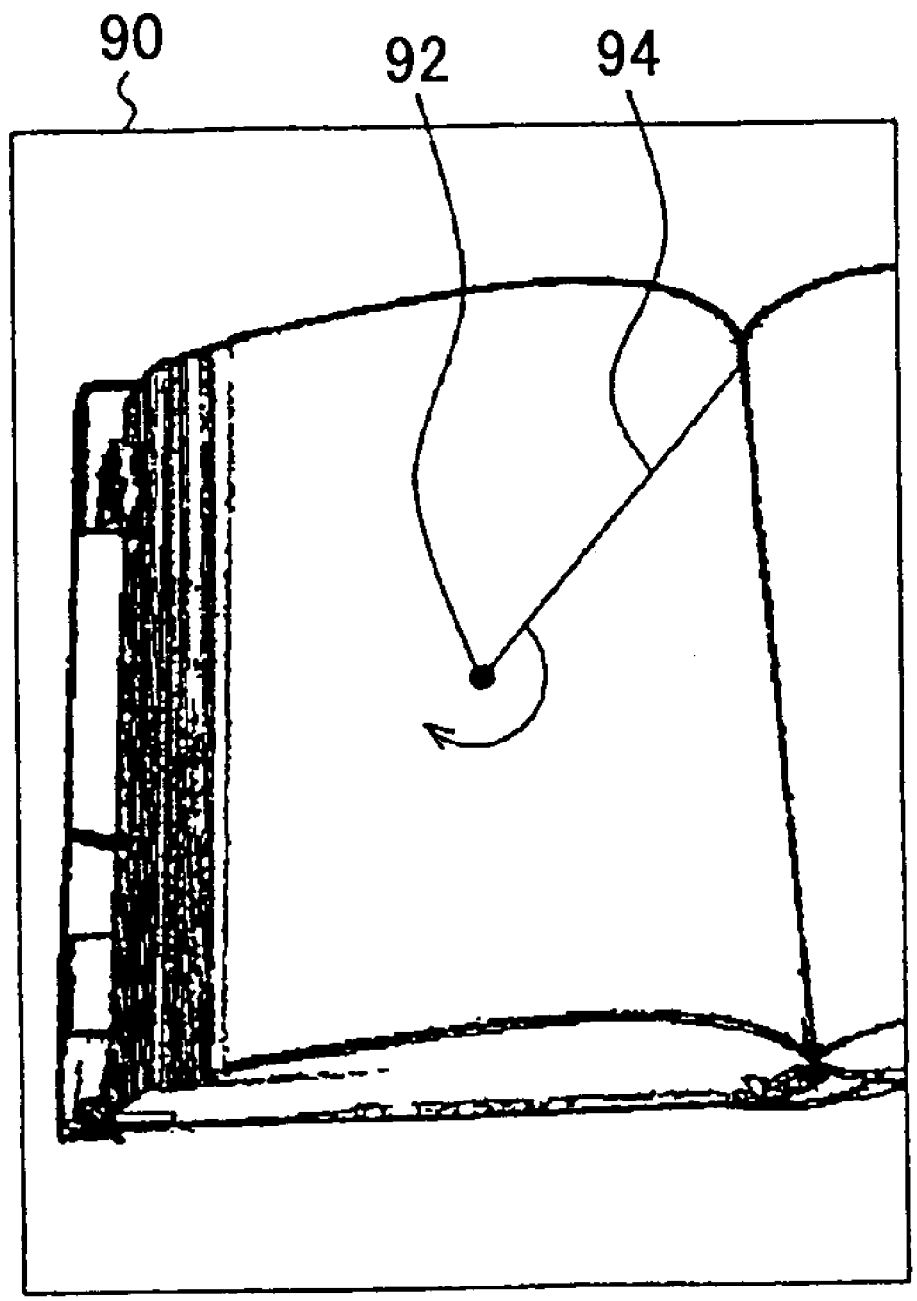
FIG. 18 is a diagram showing an edge image which is obtained by eliminating black pixel connecting components within the paper surface with respect to the edge image shown in FIG. 17.

Next, the step 24 shown in FIG. 13 carries out a noise elimination with respect to the edge image 88 shown in FIG. 17 which is eliminated of the character string region, by eliminating the small black pixel connecting components within the edge image 88, so as to virtually erase the black pixels within the paper surface and obtain an edge image 90 shown in FIG. 18. FIG. 18 is a diagram showing the edge image 90 which is obtained by eliminating the black pixel connecting components within the paper surface with respect to the edge image shown in FIG. 17.

Figure 19:
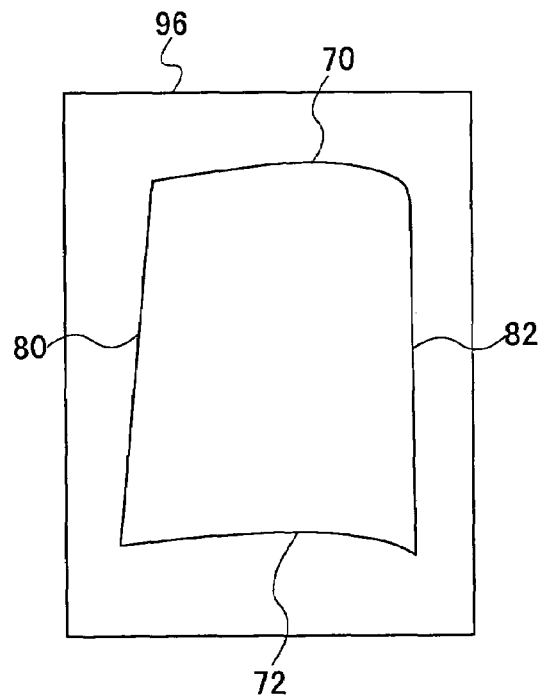
FIG. 19 is a diagram for explaining a paper surface contour image which is obtained by rotating a half straight line with respect to the edge image shown in FIG. 18.

Furthermore, the step 24 shown in FIG. 13 carries out an extraction with respect to the edge image 90 shown in FIG. 18, so as to extract the paper surface contour image which includes the noise and the unclear part (thin part). That is, with respect to the edge image 90 shown in FIG. 18 which is virtually eliminated of the black pixel components within the paper surface, a half straight line 94 having a center 92 of the paper surface as a fulcrum 92 is rotated as indicated by an arrow in FIG. 18, so as to extract the black pixel which is first crossed by the half straight line 94. As a result, although slight noise and unclear part exist as shown in FIG. 19, it is possible to extract a paper surface contour image 96 in which virtually all of the pixels are contour pixels of the paper surface. FIG. 19 is a diagram for explaining the paper surface contour image 96 which is obtained by rotating the half straight line 94 with respect to the edge image 90 shown in FIG. 18. The paper surface contour image 96 has the two-dimensional upper contour line 70, the two-dimensional lower contour line 72, the right contour line 82 and the left contour line 80.

Next, the step S25 shown in FIG. 13 carries out the right and left contour line segment extracting process using Hough transformation. In other words, with respect to the paper surface contour image 96 shown in FIG. 19 including the noise and unclear part (thin part), two straight line components 102 and 104 shown in FIG. 20, which include the left contour line 80 and the right contour line 82, are obtained by the Hough transformation of the straight line segments. The four vertexes X1, X2, X3 and X4 of the paper surface contour are obtained by the Hough transformation of the straight line segments 102 and 104.

Figure 20:
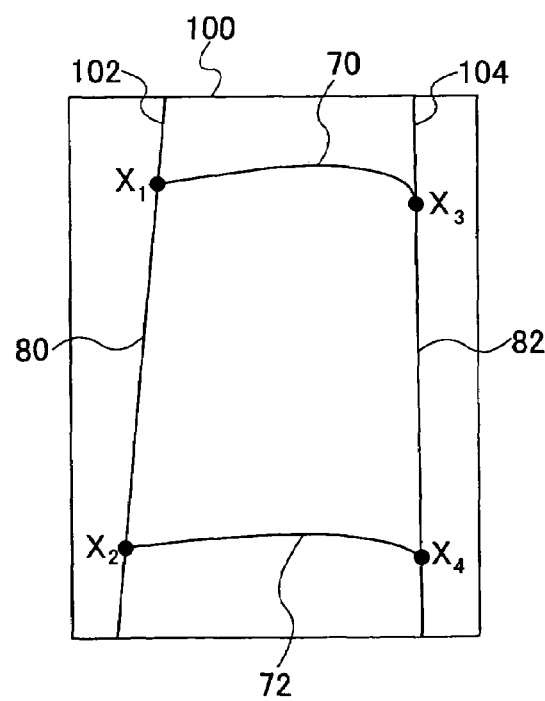
FIG. 20 is a diagram for explaining a contour line extraction result obtained by Hough transformation of straight line components.

Moreover, the step 26 shown in FIG. 13 carries out the upper and lower contour line extracting process to interpolate the break in the contour lines. In other words, in a paper surface contour image 100 shown in FIG. 20, the two-dimensional sample upper contour points and the two-dimensional sample lower contour points are extracted at a predetermined dot pitch of 10 to 50 dots, for example. FIG. 20 is a diagram for explaining the contour line extraction result obtained by Hough transformation of the straight line components.

$$X^U_i = (X^U_i, Y^U_i)(i=1, \ldots, N)$$

$$X^D_j = (X^D_j, Y^D_j)(j=1, \ldots, M)$$

The two-dimensional sample upper contour points and the two-dimensional sample lower contour points are used as the contour line information which is used for the estimation of the three-dimensional curved surface model 74 shown in FIG. 12 and for the correction of the book distortion based on the three-dimensional curved surface model 74.

In the paper surface contour extracting process shown in FIG. 13, the user may utilize the functions of the GUI 54 shown in FIG. 5, to specify the sample points of the three-dimensional curved surface model having the semi-cylindrical shape from the operating section 58, by a pointing device such as a mouse cursor, with respect to the image 84 of the book shown in FIG. 14. In this case, the specified sample points of the three-dimensional curved surface model may be used as the contour line information.

In addition, in the image 84 shown in FIG. 14, the user may specify the four vertexes of the paper surface. In this case, the paper surface contour extracting process shown in FIG. 13 may be carried out automatically based on the four vertexes of the paper surface specified by the user.

In the three-dimensional curved surface model estimating section 50 shown in FIG. 5, the three-dimensional curved surface model estimating process employs a technique which obtains the three-dimensional sample contour points and carries out a polygonal line approximation to connect the sample points. But it is of course possible to employ other techniques, such as techniques which use a curvilinear model with parameters including spline curve, Bezier curve and the like.

Moreover, in the paper surface contour image 100 shown in FIG. 20 which is obtained by the paper surface contour extracting process of the embodiment shown in FIG. 5, the four vertexes X1, X2, X3 and X4 may greatly deviate from the semi-cylindrical shape which is assumed as the three-dimensional curved surface model. In such a case, a restriction that the lengths of the three-dimensional contours are the same between the pair formed by the upper and lower contours and between the pair formed by the right and left contours is described using a predetermined energy function E with respect to the three-dimensional curved surface model having the paper surface with the semi-cylindrical shape. In addition, the three-dimensional curved surface model having the parameters, such as the constants k1 and k3 of the division ratios, which make the energy function E a minimum, is correctly estimated.

The energy function E may be defined as a linear sum of a square of the difference between the lengths of the three-dimensional upper contour line 76 and the three-dimensional lower contour line 78 of the three-dimensional curved surface model 74 shown in FIG. 12 and a square of a difference between the lengths of the right contour line 82 and the left contour line 80. This energy function E is uniquely determined by the constants k1 and k3 of the division ratios.

The constants k1 and k3, which are model parameters making the energy function E a minimum, may be obtained by the steepest descent method. In other words, by setting initial values of the constants k1 and k3 appropriately and repeatedly varying the constants k1 and k3 by the steepest descent method, it is possible to obtain the constants k1 and k3 which minimize the energy function E.

If the four vertexes x1, x2, x3 and x4 of the three-dimensional curved surface model 74 are deviated from the three-dimensional curved surface model 74 having the assumed semi-cylindrical shape of the book, the plane passing through the vertexes x1, x2, x3 and x4 may not be the anticipated xy plane of the three-dimensional coordinate. As a result, a large error may exist in the estimated camera center 62 itself. If the erroneous camera center 62 and estimated three-dimensional curved surface model 74 are used, the book distortion cannot be corrected correctly. But by automatically obtaining the constants k1 and k3 which minimize a predetermined energy function, the three-dimensional curved surface model 74 having the assumed semi-cylindrical shape of the book can be estimated accurately, so that the book distortion can be corrected correctly.

Each of the first and second embodiments of the computer-readable storage medium stores a computer program for causing a computer to carry out an image distortion correction process using the image distortion correcting method according to the present invention. A recording medium which forms the computer-readable storage medium may be any kind of medium capable of storing one or more computer programs, such as magnetic recording media, optical recording media, magneto-optical recording media, and semiconductor memory devices. Of course, the computer program to the executed by the computer may be downloaded from another computer via one or more networks, such as the Internet.

Further, the present invention is not limited to these embodiments, but various variations and modifications may be made without departing from the scope of the present invention.

What is claimed is:

1. An image distortion correcting apparatus comprising:
    an image input section to input an input image of a flat rectangular paper surface, generated by an imaging section;
    an imaging position estimating section to estimate an imaging position of the imaging section with respect to the flat rectangular paper surface from four image vertexes of the flat rectangular paper surface within the input image using relationships between the four image vertexes of the flat rectangular paper surface, and assuming that one of the four image vertexes is in a same plane as a projection of the imaging position on the flat rectangular paper surface;
    a rectangular paper surface estimating section to estimate four vertexes of the flat rectangular paper surface within a three-dimensional space based on the imaging position and the four image vertexes; and
    an image correcting section to correct a perspective transformation distortion of the input image based on the imaging position and the four vertexes within the three-dimensional space, and to output a corrected output image.

2. The image distortion correcting apparatus as claimed in claim 1, wherein both the input image input to the image input section and the corrected output image output from the image correcting section are selected from a group consisting of a black-and-white bi-level image, a gradation image and a color image.

3. The image distortion correcting apparatus as claimed in claim 1, wherein the imaging position estimating section uses a graphic user interface (GUI) to enable a user to specify the four vertexes of the flat rectangular paper surface within the input image.

4. The image distortion correcting apparatus as claimed in claim 1, wherein the image correcting section obtains a position within the input image corresponding to each pixel in the corrected output image after correction using a plane coordinate system having contours as coordinate axes, and sets a value of a corresponding pixel within the input image as a target pixel value of the corrected output image, so as to output the corrected output image having a width determined by lengths of upper and lower contours and a height determined by lengths of right and left contours.

5. An image distortion correcting apparatus comprising:
an image input section to input an input image of a curved rectangular paper surface of an open book, generated by an imaging section;
an imaging position estimating section to estimate an imaging position of the imaging section with respect to the curved rectangular paper surface from four image vertexes of the curved rectangular paper surface within the input image using relationships between the four image vertexes and assuming that one of the vertexes is in a same plane as projection of the imaging position on the curved rectangular paper;
a curved surface estimating section to estimate a three-dimensional curved surface model of the curved rectangular paper surface based on the imaging position and contour information of the curved rectangular paper surface within the input image; and
an image correcting section to correct a distortion of the input image based on the imaging position and the three-dimensional curved surface model of the curved rectangular paper surface, and to output a corrected output image.

6. The image distortion correcting apparatus as claimed in claim 5, wherein both the input image input to the image input section and the corrected output image output from the image correcting section are selected from a group consisting of a black-and-white bi-level image, a gradation image and a color image.

7. The image distortion correcting apparatus as claimed in claim 5, wherein the imaging position estimating section uses a graphic user interface (GUI) to enable a user to specify the four vertexes of the paper surface within the input image.

8. The image distortion correcting apparatus as claimed in claim 5, wherein the curved surface estimating section estimates a semi-cylindrical shape having an upper surface as the curved paper surface within a three-dimensional space, based on the imaging position and a distortion in a paper surface contour within the input image.

9. The image distortion correcting apparatus as claimed in claim 5, further comprising:
a paper surface contour extracting section to extract paper surface contour information indicative of the curved paper surface contour within the input image.

10. The image distortion correcting apparatus as claimed in claim 9, wherein the paper surface contour extracting section uses a graphic user interface (GUI) to enable a user to specify sample points of the paper surface contour.

11. The image distortion correcting apparatus as claimed in claim 9, wherein the paper surface contour extracting section uses a graphic user interface (GUI) to enable a user to specify four vertexes of the curved paper surface within the input image, so as to automatically extract the curved paper surface contour information by an image processing.

12. The image distortion correcting apparatus as claimed in claim 9, wherein the paper surface contour extracting section automatically extracts all of the paper surface contour information by an image processing.

13. The image distortion correcting apparatus as claimed in claim 9, wherein the paper surface contour extracting section uses a curvilinear model with parameters including spline curve and Bezier curve, as the paper surface contour information to be extracted.

14. The image distortion correcting apparatus as claimed in claim 9, wherein the paper surface contour extracting section uses a polygonal model as the paper surface contour information to be extracted.

15. The image distortion correcting apparatus as claimed in claim 5, wherein the curved surface estimating section describes, with respect to the three-dimensional curved surface model of the curved paper surface, a restriction that lengths of three-dimensional contours are the same between a pair formed by upper and lower contours and between a pair formed by right and left contours of the three-dimensional curved surface model, using a predetermined energy function, and estimates a three-dimensional curved surface model having parameters which minimize the predetermined energy function.

16. The image distortion correcting apparatus as claimed in claim 5, wherein the image correcting section obtains a position within the input image corresponding to each pixel in the corrected output image using a surface coordinate system having contours as coordinate axes, and sets a value of a corresponding pixel within the input image as a target pixel value of the corrected output image, so as to output the corrected output image having a width determined by lengths of upper and lower contours and a height determined by lengths of right and left contours.

17. An image distortion correcting method comprising:
inputting an input image of a flat rectangular paper surface, generated by an imaging section;
estimating an imaging position of the imaging section with respect to the flat rectangular paper surface from four image vertexes of the flat rectangular paper surface within the input image, using relationships between the four image vertexes of the flat rectangular paper surface, and assuming that one of the four image vertexes is in a same plane as a projection of the imaging position on the flat rectangular paper surface;
estimating four vertexes of the flat rectangular paper surface within a three-dimensional space based on the imaging position and the four image vertexes; and
correcting a perspective transformation distortion of the input image based on the imaging position and the four vertexes within the three-dimensional space, and to output a corrected output image.

18. The image distortion correcting method as claimed in claim 17, wherein both the input image and the corrected output image are selected from a group consisting of a black-and-white bi-level image, a gradation image and a color image.

19. The image distortion correcting method as claimed in claim 17, wherein during the estimating of the imaging position a graphic user interface (GUI) enables a user to specify the four vertexes of the paper within the input image.

20. The image distortion correcting method as claimed in claim 17, wherein the correcting obtains a position within the input image corresponding to each pixel in the corrected output image using a plane coordinate system having contours as coordinate axes, and sets a value of a corresponding pixel within the input image as a target pixel value of the corrected output image, so as to output the corrected output image having a width determined by lengths of upper and lower contours and a height determined by lengths of right and left contours.

21. An image distortion correcting method comprising:
inputting an input image of a curved rectangular paper surface of an open book, generated by an imaging section;
estimating an imaging position of the imaging section with respect to the curved rectangular paper surface from four image vertexes of the curved rectangular paper surface within the input image, using relationships between the four image vertexes and assuming that one of the vertexes is in a same plane as projection of the imaging position on the curved rectangular paper surface;

estimating a three-dimensional curved surface model of the curved rectangular paper surface based on the imaging position and contour information of the curved rectangular paper surface within the input image; and correcting a book distortion of the input image based on the imaging position and the three-dimensional curved surface model of the curved rectangular paper surface, and to output a corrected output image.

22. The image distortion correcting method as claimed in claim 21, wherein both the input image input and the corrected output image are selected from a group consisting of a black-and-white bi-level image, a gradation image and a color image.

23. The image distortion correcting method as claimed in claim 21, wherein the estimating of the imaging position uses a graphic user interface (GUI) to enable a user to specify the four vertexes of the curved paper surface within the input image.

24. The image distortion correcting method as claimed in claim 21, wherein the estimating of the a three-dimensional curved surface model of the curved paper surface, estimates a semi-cylindrical shape having an upper surface as the curved paper surface within a three-dimensional space, based on the imaging position and a distortion in a paper surface contour within the input image.

25. The image distortion correcting method as claimed in claim 21, further comprising:

extracting paper surface contour information indicative of a contour of the curved paper surface within the input image.

26. The image distortion correcting method as claimed in claim 25, wherein the extracting of the paper surface contour uses a graphic user interface (GUI) to enable a user to specify sample points of the paper surface contour.

27. The image distortion correcting method as claimed in claim 25, wherein the extracting of the paper surface contour uses a graphic user interface (GUI) to enable a user to specify four vertexes of the curved paper surface within the input image, so as to automatically extract the paper surface contour information by an image processing.

28. The image distortion correcting method as claimed in claim 25, wherein the extracting of the paper surface contour automatically extracts all of the paper surface contour information by an image processing.

29. The image distortion correcting method as claimed in claim 25, wherein the extracting of the paper surface contour uses a curvilinear model with parameters including spline curve and Bezier curve, as the paper surface contour information to be extracted.

30. The image distortion correcting method as claimed in claim 25, wherein the extracting of the paper surface contour uses a polygonal model as the paper surface contour information to be extracted.

31. The image distortion correcting method as claimed in claim 21, wherein the estimating of the three-dimensional curved surface model of the curved paper surface describes, with respect to the three-dimensional curved surface model of the paper surface, a restriction that lengths of three-dimensional contours are the same between a pair formed by upper and lower contours and between a pair formed by right and left contours of the three-dimensional curved surface model, using a predetermined energy function, and estimates a three-dimensional curved surface model having parameters which minimize the predetermined energy function.

32. The image distortion correcting method as claimed in claim 21, wherein the correcting obtains a position within the input image corresponding to each pixel in the corrected output image using a surface coordinate system having contours as coordinate axes, and sets a value of a corresponding pixel within the input image as a target pixel value of the corrected output image, so as to output the output image having a width determined by lengths of upper and lower contours and a height determined by lengths of right and left contours.

33. A computer-readable storage medium which stores a program for causing a computer to carry out an image distortion correcting process, said program comprising:

an image input procedure causing the computer to input an image of a flat rectangular paper surface imaged by an imaging section as an input image;

an imaging position estimating procedure causing the computer to estimate an imaging position of the imaging section with respect to the flat rectangular paper surface from four image vertexes of the flat rectangular paper surface within the input image, using relationships between the four image vertexes of the flat rectangular paper surface, and assuming that one of the four image vertexes is in a same plane as a projection of the imaging position on the flat rectangular paper surface;

a rectangular paper surface estimating procedure causing the computer to estimate four vertexes of the flat rectangular paper surface within a three-dimensional space based on the imaging position and the four image vertexes; and an image correcting procedure causing the computer to correct a perspective transformation distortion of the input image based on the imaging position and the four vertexes within the three-dimensional space, so as to output a corrected output image of the flat rectangular paper surface.

34. The computer-readable storage medium as claimed in claim 33, wherein both the input image input to the image input procedure and the corrected output image output from the image correcting procedure are selected from a group consisting of a black-and-white bi-level image, a gradation image and a color image.

35. The computer-readable storage medium as claimed in claim 33, wherein the imaging position estimating procedure causes the computer to use a graphic user interface (GUI) so as to enable a user to specify the four vertexes of the paper surface within the input image.

36. The computer-readable storage medium as claimed in claim 33, wherein the image correcting procedure causes the computer to obtain a position within the input image corresponding to each pixel in the corrected output image after correction using a plane coordinate system having contours as coordinate axes, and to set a value of a corresponding pixel within the input image as a target pixel value of the corrected output image, so as to output the corrected output image having a width determined by lengths of upper and lower contours and a height determined by lengths of right and left contours.

37. A computer-readable storage medium which stores a program for causing a computer to carry out an image distortion correcting process, said program comprising:

an image input procedure causing the computer to input an image of a curved rectangular paper surface of an open book imaged by an imaging section, as an input image;

an imaging position estimating procedure causing the computer to estimate an imaging position of the imaging section with respect to the curved rectangular paper surface from four image vertexes of the curved paper surface within the input image, using relationships between the four image vertexes and assuming that one of the vertexes is in a same plane as projection of the curved rectangular paper surface;

a curved surface estimating procedure causing the computer to estimate a three-dimensional curved surface model of the curved rectangular paper surface based on the imaging position and contour information of the curved rectangular paper surface within the input image; and an image correcting procedure causing the computer to correct a book distortion of the input image based on the imaging position and the three-dimensional curved surface model of the curved rectangular paper surface, so as to output a corrected output image.

38. The computer-readable storage medium as claimed in claim 37, wherein both the input image and the corrected output image are selected from a group consisting of a black-and-white bi-level image, a gradation image and a color image.

39. The computer-readable storage medium as claimed in claim 37, wherein the imaging position estimating procedure causes the computer to use a graphic user interface (GUI) so as to enable a user to specify the four vertexes of the curved paper surface within the input image.

40. The computer-readable storage medium as claimed in claim 37, wherein the curved surface estimating procedure causes the computer to estimate a semi-cylindrical shape having an upper surface as the curved paper surface within a three-dimensional space, based on the imaging position and a distortion in a paper surface contour within the input image.

41. The computer-readable storage medium as claimed in claim 37, further comprising:

a paper surface contour extracting procedure causing the computer to extract paper surface contour information indicative of the curved paper surface contour within the input image.

42. The computer-readable storage medium as claimed in claim 41, wherein the paper surface contour extracting procedure causes the computer to use a graphic user interface (GUI) so as to enable a user to specify sample points of the paper surface contour.

43. The computer-readable storage medium as claimed in claim 41, wherein the paper surface contour extracting procedure causes the computer to use a graphic user interface (GUI) to enable a user to specify four vertexes of the paper surface within the input image, so as to automatically extract the curved paper surface contour information by an image processing.

44. The computer-readable storage medium as claimed in claim 41, wherein the paper surface contour extracting procedure causes the computer to automatically extract all of the paper surface contour information by an image processing.

45. The computer-readable storage medium as claimed in claim 41, wherein the paper surface contour extracting procedure causes the computer to use a curvilinear model with parameters including spline curve and Bezier curve, as the paper surface contour information to be extracted.

46. The computer-readable storage medium as claimed in claim 41, wherein the paper surface contour extracting procedure causes the computer to use a polygonal model as the paper surface contour information to be extracted.

47. The computer-readable storage medium as claimed in claim 37, wherein the curved surface estimating procedure causes the computer to describe, with respect to the three-dimensional curved surface model of the curved paper surface, a restriction that lengths of three-dimensional contours are the same between a pair formed by upper and lower contours and between a pair formed by right and left contours of the three-dimensional curved surface model, using a predetermined energy function, and to estimate a three-dimensional curved surface model having parameters which minimize the predetermined energy function.

48. The computer-readable storage medium as claimed in claim 37, wherein the image correcting procedure causes the computer to obtain a position within the input image corresponding to each pixel in the corrected output image using a surface coordinate system having contours as coordinate axes, and to set a value of a corresponding pixel within the input image as a target pixel value of the corrected output image, so as to output the corrected output image having a width determined by lengths of upper and lower contours and a height determined by lengths of right and left contours.

* * * * *

UNITED STATES PATENT AND TRADEMARK OFFICE
CERTIFICATE OF CORRECTION

PATENT NO. : 7,418,126 B2
APPLICATION NO. : 10/609575
DATED : August 26, 2008
INVENTOR(S) : Katsuhito Fujimoto et al.

It is certified that error appears in the above-identified patent and that said Letters Patent is hereby corrected as shown below:

Column 25, Line 12, after "the input image" delete "input", second occurrence.

Column 25, Line 22, after "of the" delete "a".

Column 26, Line 16, after "section" insert --,--.

Signed and Sealed this

Sixteenth Day of February, 2010

David J. Kappos
*Director of the United States Patent and Trademark Office*